United States Patent [19]
Erickson

[11] Patent Number: 6,108,967
[45] Date of Patent: Aug. 29, 2000

[54] PIPELINE UTILIZATION ENHANCEMENT INCLUDING CARBON DIOXIDE GAS TRANSMISSION, DISTRIBUTION, AND DELIVERY TECHNIQUE

[75] Inventor: Stewart E. Erickson, Hudson, Wis.

[73] Assignee: The Agricultural Gas Company, Hudson, Wis.

[21] Appl. No.: 09/219,582

[22] Filed: Dec. 23, 1998

Related U.S. Application Data

[63] Continuation of application No. PCT/US97/11612, Jun. 27, 1997
[60] Provisional application No. 60/021,131, Jun. 28, 1996.

[51] Int. Cl.$^7$ .................................................. A01C 29/00
[52] U.S. Cl. ............................................................... 47/1.01 R
[58] Field of Search .......................... 47/1.01 R, 1.4; 48/190, 210; 62/28, 24, 23, 27; 134/22.11, 22.12; 137/3, 88; 422/200, 199

[56] References Cited

U.S. PATENT DOCUMENTS

| | | |
|---|---|---|
| 3,136,325 | 6/1964 | Mattix . |
| 3,269,401 | 8/1966 | Scott et al. . |
| 3,328,089 | 6/1967 | Hodgson et al. . |
| 3,389,714 | 6/1968 | Hughes et al. . |
| 3,596,437 | 8/1971 | Styring, Jr. et al. . |
| 3,888,434 | 6/1975 | Chersky et al. . |
| 3,906,972 | 9/1975 | Jensen et al. ................... 137/13 X |
| 4,206,610 | 6/1980 | Santhanam . |
| 4,605,329 | 8/1986 | Duffy . |
| 4,721,420 | 1/1988 | Santhanam et al. . |
| 4,728,341 | 3/1988 | Nielsen . |
| 5,242,664 | 9/1993 | Willot et al. . |
| 5,386,927 | 2/1995 | Janssen ................................. 222/1 |
| 5,397,553 | 3/1995 | Spencer ............................. 422/243 |

OTHER PUBLICATIONS

"California Millionaire Has Plans to Float Water to Parched Regions", *The Salt Lake Tribune*, Nation, May 3, 1996.
Energy Information Administration, "Natural Gas 1995: Issues and Trends", Nov. 1995, pp. 1–67.

*Primary Examiner*—Robert E. Pezzuto
*Attorney, Agent, or Firm*—Fredrikson & Byron, P.A.

[57] ABSTRACT

The present invention involves utilization of carbon dioxide, $CO_2$, gas produced from various natural and manmade sources. Where such gas is vented as a waste by-product into the atmosphere, it is a leading gaseous emission contributing to the Earth's atmospheric greenhouse effect and ultimately to devastating global warming. The present invention can include a method of transmission, distribution and utilization of $CO_2$ gas. This aspect of the invention includes the transmission of $CO_2$ gas through idled natural gas pipelines during summer months and delivery of the $CO_2$ gas to field crops to increase crops' yields. This method will increase the seasonal utilization "load factor" of natural gas pipelines during "off peak" non-heating months, when natural gas is in low demand. Further, the invention can provide a distribution mechanism consisting of a series of trunk lines with gate valves linking to primary manifolds. The primary manifolds may in turn be connected to a series of secondary exhaust pipeline rows. This gas distribution system is compatible with existing farming practices and farming implements. Automated delivery of $CO_2$ through the distribution mechanism's rows of exhaust pipes is easily adapted to remote control by electronic field monitoring devices that economically, precisely, and evenly distribute $CO_2$ gas to field crops. The gas distribution grid, electronic monitoring and automated delivery controls can all be linked in a gas preparation facility designed to optimize the gaseous medium including $CO_2$ concentrations and temperatures incident to crops for photosynthesis.

34 Claims, 19 Drawing Sheets

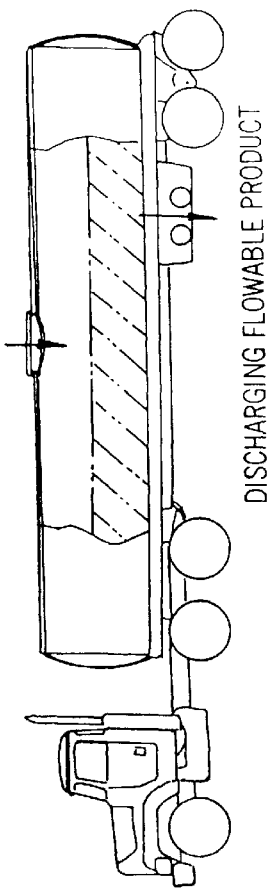
FIG. 13a TANKER FILLED WITH LIQUID OR FLOWABLE SOLID
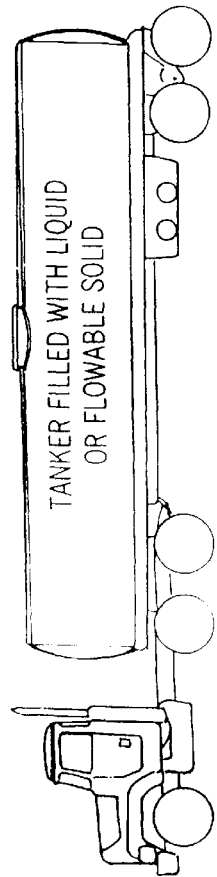
FIG. 13b EQUAL VOLUME OF CO2 GAS REPLACES FLOWABLE CONTENTS
DISCHARGING FLOWABLE PRODUCT
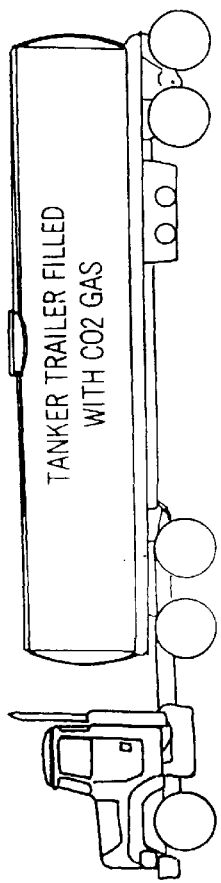
FIG. 13c TANKER TRAILER FILLED WITH CO2 GAS
FLOWABLE PRODUCT INTO TOP OF TANKER TRAILER
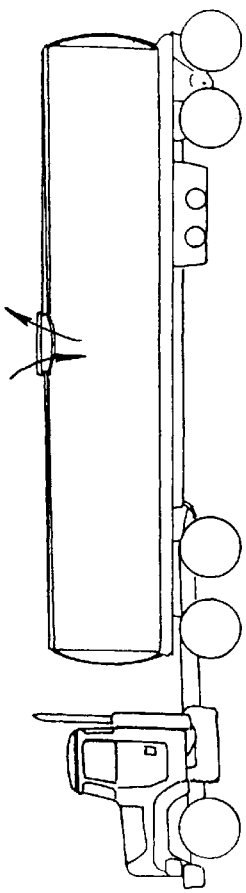
FIG. 13d CO2 GAS DISPLACED/VENTED OUT OF TANKER TRAILER AND DELIVERED TO AGRICULTURAL SITE/GAS PREPARATION PLANT

PIPELINE UTILIZATION ENHANCEMENT INCLUDING CARBON DIOXIDE GAS TRANSMISSION, DISTRIBUTION, AND DELIVERY TECHNIQUE

RELATED APPLICATIONS

This application is a continuation of and claims priority to U.S. Provisional Application No. 60/021,131 filed Jun. 28, 1996 and International Application No. PCT/US97/11612 filed Jun. 27, 1997.

FIELD OF THE INVENTION

The present invention, in different embodiments, relates to waste recycling, delivery of a gas, and to agriculture. One aspect of the invention has particular utility in connection with the utilization of waste $CO_2$ gas delivered through a pipeline. Another aspect of the invention provides a way to improve crop yields without disrupting current farming or silvicultural techniques.

BACKGROUND OF THE INVENTION

Since the first use of natural gas in Fredonia, N.Y. in 1820 it has been known that natural gas can be used as an energy source. During the oil boom, oil drillers would quite often strike a well of natural gas or an oil reserve that held natural gas in solution when they were drilling for oil. Energy developers, however, rushing to develop petroleum reserves, considered striking one of these natural gas reserves as an embarrassment and a hindrance. This natural gas would be "burned off" or the well would be capped. The oil drillers considered the natural gas useless, and if the drilling project bared natural gas rather than oil, the well was considered a failure. Oilmen actually had low esteem for people involved with natural gas development. For many years, few if any markets for natural gas developed. Consequently, in Texas, Louisiana, Oklahoma, Kansas and a few other natural gas-producing states, trillions of cubic feet of natural gas produced during oil production were simply burned or "flared off" into the atmosphere. For years the burning flares of natural gas were a familiar glow in the skies over oil fields.

In the 1930's, however, some keen energy developers started realizing the immense potential of natural gas as an energy resource if could be refined, handled, and piped to markets. World War II, however, slowed development of natural gas reserves as a energy resource. After World War II with the introduction of new thin walled pipeline technology and cold bending and welding that allowed increased pipe diameters up to 36 inches, a natural gas/energy revolution was born. Energy managers began and continue to spend hundreds of billions of dollars to extend extensive natural gas pipeline networks. For example, pipelines now link the United States' Gulf Coast natural gas deposits to large natural gas markets, notably the Midwest and the Northeastern United States, where it is combusted extensively for home and building heating.

Natural gas consists mainly of methane, but reserves vary significantly in composition. Natural gas is commonly extracted from underground sources as a gas cap over oil reserves, gas stored in an oil solution, or as gas well reserves. Numerous bore holes into the natural gas reserves are capped and controlled with well heads, which in turn are connected to small or medium size gathering lines. A number of these smaller gathering lines originating from a number of well heads frequently interconnect to a field gas processing facility, which removes undesirable non-hydrocarbon fractions from the natural gas. This non-hydrocarbon fraction typically consists of varying amounts of water vapor, helium, nitrogen, hydrogen sulfide, and carbon dioxide, among others, with water vapor, hydrogen sulfide and carbon dioxide being most prevalent. At the field gas processing facility water vapor is removed by passing the natural gas through a desiccant that dehydrates the moisture, and $CO_2$ can be removed selectively or in conjunction with hydrogen sulfide typically by passing the gas through an amine solution. Gas well heads are usually controlled to deliver raw gas at stable rates so contaminants can be consistently and efficiently removed at the field gas processing facility.

After field gas processing, a group of more significant gathering pipelines typically converge, interconnect and merge numerous gas wells, gas fields and smaller field gas processing facilities, as described above, to larger centralized gas processing facilities. These large natural gas processing facilities further scrub the gas of non-hydrocarbon impurities, but substantially extract a desirable hydrocarbon and hydrogen fraction from the natural gas as condensates or distillates. These desirable extracted gases include: propane, butane, pentane, and hydrogen. These naturally occur in the natural gas are generally cooled under controlled pressure conditions at the centralized gas processing facilities, which allows for this fraction's condensation and removal. This protects the pipeline against hydrates, which often freeze and clog the gathering and transmission pipelines. The liquid hydrocarbon and hydrogen distillates are valuable and utilized.

The refined natural gas that exits a centralized gas processing facility for transmission purposes typically comprises about 95% methane ($CH_4$), less than about 1% $CO_2$ (generally about 0.8% $CO_2$ remaining after gas processing), about 1% nitrogen ($N_2$) gas (remaining after gas processing), about 2.7% ethane, about 0.15% propane, about 0.35% hydrogen ($H_2$) gas, and about 0.03% helium and other trace gases. Methane is colorless and odorless, so the gas is typically stenched with a sulfur compound like mercaptan for transmission, to purposefully give the gas an odor that allows gas leaks to be safely and easily detected by the human nose. This odorized methane (with generally less than 1% $CO_2$) is then introduced into large transmission pipelines for shipment to distant markets. End use is often several thousand miles away from the originating gas well heads, field processing facilities and gas processing centers, so a series of compressors are employed along the lengthy transmission route to boost pressures, thus moving the methane gas through the pipeline.

Today, natural gas is considered the world's cleanest energy source because its principal refined chemical constituent for transmission, methane, when combusted produces few particulates, little adverse sulfur emissions, and no ash by-product. Notable amounts of water vapor and carbon dioxide gas are produced, however, from the combustion of methane. These water vapor and $CO_2$ gas by-products are considered harmless by-products and are generally vented into the atmosphere through an exhaust stack. Natural gas' clean burning characteristics and ability to form chemical bonds make it an invaluable ingredient in the manufacturing of plastic polymers, fertilizers, and a host of other critical industrial and household chemicals. The majority of the world's chemical industry is centered around large reserves of natural gas. In the U.S., for example, industrial centers are positioned near the Gulf Coast of Louisiana and Houston, Tex., a large natural gas processing area. Many of these industrial processes/facilities also produce carbon dioxide, which is again considered a waste to be vented.

As mentioned earlier, many of the major natural gas pipelines in the U.S. extend from the gas producing region along the Gulf of Mexico Coastal Region to the Northeast and Midwest regions, where vast amounts of natural gas are burned to heat buildings during the winter. From November to March these pipelines carry natural gas to metropolitan heating markets from many distant, often rural and remote gas fields. Extensive pipeline networks for transmission and distribution of natural gas for heating purposes are designed, engineered and constructed to deliver peak winter demands. During extreme winter cold periods in the northern United States vast amounts of natural gas are combusted to heat homes and buildings, taxing the gas transmission network's ability to keep up with demand. In the warmer spring, summer, and autumn months the demand for natural gas plummets, though, leaving as much as 75% of the pipelines' transmission capacity inactive from April through October. The methane requirements of base industrial processes keep only a portion of the capacity active transmitting natural gas. Significant amounts of natural gas are also produced from off-shore platforms located in large bodies of water like the Gulf of Mexico which are linked to on-shore markets by transmission pipelines. Extensive off-shore natural gas production also takes place in the North Sea and other regions. In the Southern Hemisphere the cold months of natural gas demand are the opposite of the Northern Hemisphere, reflecting fall and winter from April to October south of the equator.

The resulting peaks and valleys in demand in pipelines servicing the northern climates, i.e., the differences between the winter months of high demand and the summer months of low demand, are problematic and costly to the natural gas industry and consumers. This seasonal variation in natural gas demand results in significantly higher natural gas prices to pay for the expensive fixed capital costs of exaggerated pipeline capacity to meet peak winter demand. Further, pipelines need to operate near capacity to be efficient. Typically, a gas transmission route might incorporate five or six pipelines running in parallel. As demand falls the pipelines are idled one at a time in parallel, leaving the remaining operating pipelines and compressors to transmit natural gas at an efficient level, near capacity.

To try to mitigate the affects of the high fixed costs of natural gas transmission systems and the low demand for the product during the summer, natural gas companies have employed three basic strategies to improve economic return on their fixed costs. First, natural gas is pumped year round from the U.S. Gulf Coast northward and is injected into suitable geological formations, typically porous sandstone or salt caverns, that are situated close to winter demand markets and that have the capability of safely storing natural gas underground until winter heating demand calls for it. There is a limited number of these suitable geologic formations, however, and most known strategic rock formations for gas injection/offpeak gas storage are now fully utilized, i.e., the suitable geological formations near the end use natural gas markets are being exploited for summer natural gas storage already.

The second method employed by natural gas companies to improve summer pipeline load factors is known as interruptible service. This involves getting a large industrial customer to switch to natural gas as an energy source, rather than burn a less expensive fuel alternative like coal. With interruptible service, however, comes the contingency that periodically during the peak winter heating season, the gas supply can and generally is shut off/interrupted, forcing this industrial natural gas customer to switch back to an alternative energy source for a seasonal period of time. For the inconvenient interruption of natural gas deliveries, the natural gas company then gives this customer a substantially reduced price for the natural gas, often a third to half the normal natural gas price. This makes the interruptible natural gas service an economically attractive energy option. Like underground gas injection, however, there is only a limited number of industrial customers that can economically be converted to interruptible service.

The third strategy employed by natural gas transmission companies to level peaks and valleys in seasonal demand for gas is an extensive system of liquefied natural gas, LNG, storage facilities within the winter methane gas markets. With LNG storage the methane is pumped from the Gulf Coast north throughout the summer. When the methane gas arrives at the storage facility it is compressed and supercooled into a greatly concentrated liquid form. The LNG is stored in manmade pressurized, super-cooled tanks, which maintain the methane in a liquid state until peak winter natural gas demands. LNG, storage, however, tends to be a costly option including high capital costs and high operating costs.

All three of these strategies—underground injection, interruptible service, and LNG storage—have proved successful to one degree or another to help recover the high fixed costs associated with natural gas transmission pipelines and raise summer demand for the methane gas. Nevertheless, the opportunities for these strategies is limited and a large percentage of the north-bound gas transmission infrastructure, to meet peak winter demand, remains underutilized during the summer months. Right now natural gas pipelines that are idle during the non-heating season cost the industry billions of dollars in interest on investment and represent a huge under-utilization of an asset.

In industrialized countries that lack significant energy reserves and cannot economically access reserves of natural gas via pipeline (e.g., Japan), an extensive fleet of LNG ships is employed to meet energy demands. These LNG ships return from the natural gas markets to the natural gas producing regions empty, often on a weekly basis. These ships are also underutilized during the warmer months when the demand for natural gas plummets.

Gas pipelines in the mild/temperate climates, are used more consistently throughout the year than those extending to the wintry climates, because the methane gas is used mainly for industrial processes rather than seasonal heating needs. Because natural gas is abundant in the Gulf Coast region, there is no need for high-cost interstate transmission pipelines to deliver gas in the immediate reserve region. Consequently, in regions with underlying abundant reserves of natural gas, methane is used extensively year round as an economically attractive energy option for generating electricity and as an energy source for energy intensive industrial complexes.

All this combustion of methane produces $CO_2$ which is vented into the atmosphere. Besides the extensive combustion of natural gas in the Gulf Coast region, the use of natural gas in the chemical industry and other industrial processes also produce large amounts of $CO_2$. For example, large amounts of cement, fertilizer, and lime, are produced in Texas which produces vast amounts of $CO_2$ as a by-product. Additionally, $CO_2$ is commonly used to provide the "fizz" in carbonated beverages and is used as a propellant to deliver tap beverages. $CO_2$ is also used in several industrial applications particularly for refrigeration, packaging, and transport of meat, poultry and fish.

In a manner similar to the early oil boom when natural gas was overlooked as a valuable energy resource and was treated as a waste of oil production, today $CO_2$ is generally treated as a waste by-product of industrial processes and energy production via combustion. Like natural gas in the early days of the oil boom, $CO_2$ is also vented into the atmosphere through large emission vent stacks. Trillions of cubic feet of $CO_2$ gas from combustion and industrial sources have and continue to be dumped into the Earth's atmosphere, creating a huge political debate to limit $CO_2$ emissions. Scientists predict the "greenhouse" effects of $CO_2$ gas will cause an atmospheric warming tread leading to the melting of the polar ice caps—global warming.

$CO_2$ is often liquefied, i.e., super cooled and pressurized into a liquid. It is then transported as a liquid in insulated and pressurized tanker trucks or tanker railcars. It can also be stored as dry ice in a solid form. It is also known in the art that $CO_2$ can be sequestered at depths of 500 to 1000 meters underwater, where pressures are so great that the $CO_2$ is held in a solid form known as a clathrate. U.S. Pat. No. 5,397,553, (the teachings of which are incorporated herein by reference) outlines an efficient method for conversion of $CO_2$ gas to clathrates. Also, dedicated pipeline schemes are being "Blue Skied" to sequester $CO_2$ from power plants in Europe as solid $CO_2$ clathrates at ocean depths as great as 4000 meters. (See, e.g., *New Scientists*, Jul. 17, 1993) Clathrates to date have not been viewed as a resource with value.

In a few dedicated industrial applications requiring substantial volumes of $CO_2$ gas for economic processes, some relatively short $CO_2$ gas transmission pipelines are currently in operation. $CO_2$ is also commonly re-injected into underground oil reserves to keep the pressure up in the reserve, thus enhancing the crude's recovery by pushing it to the surface. The oil industry also uses $CO_2$ to increase the flowability of oil in pipelines to reduce the energy required to pump crude, especially during the cold winter months. Use of $CO_2$ to enhance oil flow through pipelines is highlighted by U.S. Pat. Nos. 3,389,714 and 3,596,437. Santhanam's U.S. Pat. Nos. 4,206,610 and 4,721,420 (the teachings of which are incorporated herein by reference) use a dense liquid $CO_2$ medium to transport particles of coal or magnetite via pipelines. Other gases, like ammonium gas used to manufacture agricultural fertilizers, are also transported in short range transmission pipelines for delivery to markets. Final delivery of the ammonia to the farmers, however, is in a processed solid or liquid form, not a gaseous state.

For many years it has been known that carbon dioxide gas can be used to enhance plant growth. At normal atmospheric conditions $CO_2$ represents about 0.03% of the ambient air, but with a doubling of ambient $CO_2$ concentration to about 0.06%, plant yields are markedly increased by as much as 50%. Plants experiencing elevated $CO_2$ concentrations make more efficient use of available water, too. If the $CO_2$ level is increased too high (e.g., greater than 0.1%), however, the $CO_2$ will become detrimental to plant growth and may also be harmful to humans and other organisms. Most efforts to increase plant yields using $CO_2$ gas have focused on increasing plant growth in greenhouses, although some out-of-door efforts have been made by the J. R. Simplot Company, University of Michigan, Duke University and the U.S. Department of Agriculture with varying degrees of success.

While $CO_2$ gas is commonly introduced into greenhouses to increase plants' growth rates, large agricultural markets for $CO_2$ gas that can keep pace with planetary $CO_2$ emissions have not been developed. With regard to plant growth enhancement it is most economical and advantageous to distribute the $CO_2$ gas over a large area via a pipeline network or matrix. $CO_2$ "irrigation" will enhance crop yields. Other systems haven't taken into account the practicality of farmers' normal tasks, however, and don't allow for farmers' normal procedures in the fields and use standard farm implements. While the present applicant's $CO_2$ Recycling System (disclosed in PCT International Publication No. WO 95/32611, the teachings of which are incorporated herein by reference) attempts to accommodate common farming practices, that system requires the extensive movement of pipes and doesn't provide a cost effective method for the transmission and delivery of $CO_2$. Thus, venting of $CO_2$ into Earth's atmosphere proceeds as a byproduct of an energy-intensive and fossil fuel-dependent society. It would be desirable to develop a market to utilize large amounts of $CO_2$ gas.

Intensive fertilizer applications, deployment of extensive irrigation infrastructure, and the wide spread plantings of hybrid crops have been largely optimized in many areas of the world. Annual harvests and yields per acre have peaked and are declining in the U.S. With limited food surpluses and as world population and food demand sky rocket, the U.S.'s ability to keep pace with this growing global demand has failed to keep pace with billions of new mouths to feed. Some of the most prestigious authorities on the subject of world food supplies and demand predict that the next 30 years will bring rapidly deteriorating world food supplies and massive food shortages.

During any growing season, farmers across a region may experience a number of climatic events which may preclude the farmers from achieving maximum crop yield potential, resulting in poor, uneconomic harvests. Monsoons and/or wet fields in the spring can mire the entry of tractors into muddy fields, forcing the farmers to plant late, thus shortening the growing season and reducing yields. Late thaws can also preclude farmers from tilling a field at the proper time of year to reach maximum yield potential. Low sunlight intensity or temperature conditions can reduce soil temperatures resulting in poor germination conditions for seed. Flooding, drought, hail and storm damage, or high temperatures can also take a toll, especially when the crops are in their susceptible juvenile stage. Many marginal lands cannot be brought into economic productivity except with irrigation. Some regions may be able to deliver two harvests per year, but can't quite yield two mature harvests except in years of ideal weather conditions. In non-temperate regions the most prominent climatic problem farmers face is early freezing, i.e., "killing frost."

Thus, farmers are constantly looking for ways to increase crop yields per acre. Drought conditions can be alleviated through irrigation. Water delivery systems for irrigation cover millions of acres worldwide. Irrigation techniques come in various forms from ancient techniques to mobile, high-tech infrastructure. The water can be sprayed, dripped through pipes or simply allowed to flow out of canals over a field. Further, water is absorbed, attracted and held by voids in the soil so irrigation systems and water delivery can move around in a single field or be cycled from one field to the next and back again. This is very advantageous because the irrigation systems can either be totally removed from a field or be easily mobile over a large acreage. This permits the farmers to enter the field with a tractor to till, plow, sow seed, apply fertilizers, apply pesticides, etc., and to harvest the crop without bumping into irrigation infrastructure. Also, irrigation may only have to be performed for a short period of time, often a short number of critically dry days during the growing season, to prevent drought losses in crop yields.

In more arid regions, such as in the western United States, water is a valuable resource for agricultural and domestic uses. Crops demand and use the vast majority, up to 90%, of the available water in some areas. Irrigation has depleted the Colorado River causing it to dwindle into the desert and no longer even reach the Pacific Ocean. The Oglalla aquifer under the Central Plains of the United States has dropped 150 feet from irrigation pumping. Further, exploding metropolitan populations like Las Vegas are thirsty for more water. $CO_2$ enrichment can help farmers bolster crop yields and will result in plants utilizing available water far more efficiently in photosynthesis. Crops could be supplemented with $CO_2$ gas, thereby freeing agricultural water appropriations to be appropriated to other areas and/or uses. Also, introducing $CO_2$ to fields of crops would leave more water for in-stream flow and thus would enhance important fish and wildlife resources.

When farmers apply ammonium anhydrous fertilizer/ammonium to a field of crops, the plants' root systems only assimilate about fifty percent of the available nutrients. This represents a tremendous waste of an expensive fertilizer application, but is a common agricultural practice. If crops' leaves are surrounded with inflated levels of $CO_2$ gas, fertilizer nutrient uptake by plant roots would increase and farmers would realize increased yields with the same applications of fertilizers. Further, less fertilizers would then reach ground water and surface waters. Fertilizer runoff is a leading cause of "non-point" water pollution caused by the agricultural industry, contaminating surface streams, lakes, and ground water reserves that provide drinking water, fish and wildlife habitat and valuable human recreation resources.

Unlike water which is visible and tangible, $CO_2$ gas is colorless, odorless and is needed in minuscule concentrations by plants. Thus, $CO_2$ delivery to crops is more problematic to monitor, control and optimize than delivering irrigation water. Compounding this is the fact that elevated levels of $CO_2$ gas rapidly disperse and diffuse into the atmosphere, particularly under windy conditions. $CO_2$ gas can not be effectively projected by sprinklers or gravity-flooded over a large acreage in a ubiquitous manner like irrigation water. Irrigation and rain water available to crops is stored in the soil profile for many days, allowing farmers to cycle irrigation rigs and water delivery patterns from one field to the next. $CO_2$ gas, in contrast, is not held by gravity or the soil voids. Irrigation can take place anytime during the day including at night. Conversely, enhanced $CO_2$ gas should be delivered only during the growing season and only during the daylight hours when plants are undergoing photosynthesis. As a result, $CO_2$ gas presents especially troublesome complexities, making gas concentrations highly variable from one minute to the next. It would be quite difficult to accurately control delivery of tiny amounts of invisible, odorless $CO_2$ gas to field crops manually.

Gas irrigation with $CO_2$ is one method farmers can use to increase crop yields and conserve water. Large PVC pipes have been tried for $CO_2$ delivery, as have trench systems such as shown in U.S. Pat. No. 5,409,508, aqua-culture delivery system and dual use irrigation systems (all as suggested in PCT International Publication No. WO 95/32611, incorporated above by reference). Even so, to date an economical and efficient agricultural $CO_2$ gas delivery system for field crops or aqua culture has not been developed and widely deployed. Presently, $CO_2$ cannot be effectively chemically bonded into a solid form for slow release consistently throughout the daylight hours of a growing season. $CO_2$ gas must be rather evenly distributed over the entire area of the field so the gas will be incident to crops' leaves, meaning a $CO_2$ gas delivery system needs to be located in close proximity the plants. Also, the $CO_2$ gas should be delivered in a fairly continuous manner during the daylight hours when the plants are undergoing photosynthesis. Crop yields could be systematically increased if an integrated $CO_2$ gas delivery system spread the proper concentration of $CO_2$ contiguously and cost-effectively over large acreage of agricultural or forestry lands, or throughout an aqua culture operation.

This leaves the alternative of distributing $CO_2$ gas through a rather permanent conduit distribution matrix. A problem arises, however, when a farmer needs to enter the field with a tractor to plow, till, sow seed, apply fertilizer, apply pesticides etc. and to harvest at the end of the growing season. If $CO_2$ gas distribution pipelines are laying in the fields this will hinder access, getting in the way of tractor, plow and farmer. U.S. Pat. No. 5,409,508, entitled "Means and Methods for Enhancing Plant Growth Under Field Conditions," and U.S. Pat. No. 5,300,226, entitled "Waste Handling Method", (the teachings of both of which are incorporated herein by reference) are both authored by one of the present inventors. The systems disclosed in these patents don't require pipes, but do employ an extensive trench system which limits the use of normal agricultural equipment and techniques. Therefore, it would be advantageous to have a method for delivering gas efficiently to a large acreage of field crops which allows the farmer to easily access the crop fields to perform his normal agricultural tasks.

Furthermore, plants' rates of photosynthesis are extremely sensitive to the surrounding temperature and plants can be permanently damaged by freezing temperatures. Notably, photosynthetic rates and crop yields are directly tied to an optimal temperature, which around 80 degrees during daylight hours for many crops. Also, premature frost, commonly occurring at night at the beginning or end of the growing season, can be devastating. Often, a killing frost might come early in September, when the growing season normally (commonly known as "Indian Summer") extends well into November in the Northern Hemisphere. An early killing frost can send crop yields plummeting and the price of grain futures and/or the prices of fruits and vegetables at consumer levels skyrocketing in value. Also, early freezing often means that much of the grain harvesting must proceed before optimal seasonal timing, resulting in the grain needing to be thermally dried. Thermal drying is an expensive, energy intensive process for farmers. If the crops are not dried properly via thermal drying, the grains can spoil before they reach market and probably will have too high of a moisture content for proper storage in silos. If farmers can avert these early killing frosts, yields can be dramatically increased through extended growing seasons and the farmers will require much less expensive, less energy intensive thermal drying as the crops can naturally cure in the fields.

Monitoring devices exist to measure $CO_2$ levels. Various photo cells and timers exist to turn off night and day switches. Transpiration monitors exist to measure water losses of plants. Further manual controls, that provide on and off for day and night, and seasonal start stop capability are commercially available like the Toro Vision I Series Controller. But it would be desirable to have all of these parameters linked to a gas transmission and delivery system in an integrated fashion, including controls such as a Honeywell Chronotherm III thermostat and anyone of a number of commercially available monitoring devices such the Fyrite II combustion analyzer manufactured by Bacharach, Incorporated located in Pittsburgh, Pa., which can monitor $CO_2$ levels.

It is important to note that many of the natural gas pipelines in the United States originate along the Gulf Coast and mid-southern states which have seasonally warm climates. Most of the southern areas' indigenous vegetation includes what is commonly known among the science as $C_4$ plants. $C_4$ plants do not go dormant through a chemical adaptation to year-round temperatures above freezing. In the higher latitudes that experience common freezing and winter conditions, indigenous vegetative species are $C_3$ plants, which go dormant during the winter when temperatures are below freezing. $C_3$ plants tend to be stimulated to more rapid growth rates by increased introduction of carbon dioxide gas than do $C_4$ plants, while $C_4$ plants may be stimulated at lower levels, but on a year round basis. Therefore, it will be most beneficial to deliver $CO_2$ gas to the growing regions and crop species that will respond the most economically to gas fertilization. Wheat, cotton, soy beans, many vegetables and many tree species will respond markedly to $CO_2$ gas enhancement. Corn, the largest U.S. grain crop, however, does not exhibit significant growth increases when exposed to elevated levels of $CO_2$ gas.

The world's growing population and appetite for higher living standards is creating unprecedented demand for food, water, and energy. Much of this growing demand is in the highly populated emerging industrial economies of countries like India and China, where land, food, water, and energy resources have already reached constrictive limits. For instance, vast new generating capacity will be needed to meet these emerging industrial economies' increasing demand for electricity. Many energy experts predict most of this increasing demand for electrical generating capacity will be produced by the burning of coal. Coal creates much more air pollution than does the burning of natural gas, including acid rain and $CO_2$ greenhouses gases, exasperating the environmental problems that are already plaguing these developing countries. A technological breakthrough involving energy efficiency and agricultural production could help these populous countries tremendously.

Currently, carbon dioxide gas is considered a waste product of almost all combustion and industrial processes. Natural gas pipelines are not fully utilized during summer months. Farmers are looking for ways to increase crop yields to meet escalating comestibles demand. Hence, a tremendous opportunity exists and it would be desirable to link the $CO_2$ emission sources with agricultural $CO_2$ gas markets using natural gas pipelines that are idled for the spring, summer and fall.

SUMMARY OF THE INVENTION

One embodiment of the present invention provides a method of utilizing waste carbon dioxide gas which includes, during a cold season, transmitting refined natural gas containing less than 1% carbon dioxide through a pipeline from a natural gas collection site to a natural gas receiving site located remotely of the natural gas collection point. During a warm season, a carbon dioxide-enriched gas containing greater than 1% carbon dioxide is transmitted through the same pipeline from a waste carbon dioxide collection area to a carbon dioxide utilization site located remotely of the natural gas collection point. Further embodiments of this method provide additional optimizations. For example, the concentration of carbon dioxide in the carbon dioxide-enriched can be maintained at a predetermined level of between about 3% and about 97%, with the $CO_2$ level in the pipeline being relatively gradually increased from the initial <1% level to the predetermined level when switching between natural gas and the $CO_2$-enriched gas. The method may include separating a carbon dioxide-rich fraction from the $CO_2$-enhanced gas at a gas processing plant and distributing that gas to a field of plants to enhance growth of the plants.

In one aspect, the invention defines a commercially advantageous and environmentally safe method for utilizing waste $CO_2$ gas from combustion sources and from industrial processes. In one embodiment, the invention provides a method for economically transporting $CO_2$ gas from producing sources to distant agricultural markets using natural gas pipelines that are underutilized during the summer months. In one preferred embodiment, the $CO_2$ gas is used to enhance the gaseous medium surrounding crops' leaves, thus stimulating the plants' rate of photosynthesis and thus crop yields.

In one embodiment, relatively pure $CO_2$ is introduced into natural gas transmission pipelines that are inactive during periods of low natural gas demand. The $CO_2$ gas is then delivered to field crops. In another embodiment, greater than one percent $CO_2$ is intentionally mixed with methane, providing optimally efficient pipeline transmission of both gases to a remote site. In this second embodiment the $CO_2$ gas is separated from the methane gas at a remote site. The $CO_2$ gas is then delivered to field crops, and the methane can be sold for combustion or other industrial uses.

In another embodiment, a main transmission pipeline links into a series of smaller $CO_2$ gas trunk lines that deliver the gas to the agricultural fields of use. Where the trunk lines reach the field of destination, they are connected to a series of primary manifolds through a manually or electronically controlled valve, e.g. a gate valve. This valve at the interface between the trunk line and primary manifold can either be shut on or off, or be adjusted to deliver specific volumes of gas into the primary manifold. The primary manifolds are desirably laid out generally parallel to one edge of the field, preferably extending generally parallel to the prevailing winds during the growing season. The primary manifolds can be buried below plow depth underneath the fields, with riser pipes situated at intervals along the length of the primary manifold and extending to the surface of the soil in the fields. The riser pipes are connected to the secondary exhaust pipeline rows. Alternatively, the primary manifolds can be laid out adjacent the outer edge of the field in a road ditch, for instance, and may provide detachable connections to secondary exhaust pipelines arranged in rows located in fields of crops.

In accordance with another embodiment of the invention, evenly spaced ports are provided along the length of, and in at least one side of, the primary manifolds. These ports may be releasably connectable to secondary exhaust tubes through these port fittings. These secondary exhaust tubes can include a series of tiny holes (e.g., less than one half inch in diameter) spaced along their length. The secondary exhaust pipes may be approximately one inch in diameter. These smaller tubes lay in the fields of use for distribution of $CO_2$ gas from the pipeline network, to the atmosphere surrounding the field of crops. In another embodiment, the primary manifolds may have ports on diametrically opposed sides allowing secondary pipes to extend into fields in opposite perpendicular directions from the primary manifolds.

These primary manifolds are desirably greater than one inch in diameter and may be interconnected with a network of interval rows comprised of smaller secondary exhaust lines, which are laid out in evenly situated rows across the surface of a field designated for crops and/or tree growth. Generally equally-spaced rows of secondary pipes may extend across a field allowing tractors, plows and other farm equipment to enter and work the fields in a normal manner, while at the same time providing for even distribution of $CO_2$ gas over a large acreage.

In yet another embodiment, the secondary pipeline rows are laid out approximately perpendicular to the prevailing winds during the summer growing season with the first pipe being laid out on the upwind edge of the field. The secondary pipelines may extend nearly the entire length of the field, but stop short of either end of the field to provide space for a tractor, plow or other farm equipment to turn around without running into a row of secondary pipes. When contour farming practices are employed, it is desirable to lay the secondary exhaust tubes in parallel to the convoluted contour plowing and planting configuration.

In a further embodiment of the invention, the secondary pipeline tubes are secured to the ground by stakes 28 placed at intervals along the row of tubing and which are driven into the ground, so light-weight secondary tubing is not displaced by high winds and storms. The primary manifolds can be similarly staked to the ground if they are not buried.

These secondary pipeline rows may deliver pure $CO_2$ and enhanced temperatures. The optimized temperature and enriched $CO_2$ delivery may be electronically monitored and remotely controlled. The pure $CO_2$ gas may be deliver in electronically commanded, metered bursts controlled through the primary manifolds' gate valves. These burst would occur during daylight hours as optimal gas levels need to be achieved. In another embodiment these secondary exhaust pipeline rows can be of a slightly larger diameter (e.g., one inch or greater), and deliver more dilute $CO_2$ mixture containing between 0.03% and 0.1% $CO_2$, with about 0.04% to about 0.1% $CO_2$ being particularly preferred. Alternatively, the enriched gas can be delivered in a continuous flow during daylight hours.

In another preferred embodiment, the $CO_2$ gas delivery system is manually turned on when the field crops reach a juvenile stage, approximately 3" to 6" in height, early in the growing season and is manually turned off once the crops have matured and are ready for harvest or curing. In an alternative embodiment in regions of temperate climate where freezing doesn't normally occur, the gas enhancement may be employed year-round, particularly if trees are grown or year-round cropping is employed.

The electronically controlled delivery can be connected to any one of a number of commercially available photocells which activates the system for use during periods of light and deactivates the delivery of gas during periods of darkness. In an alternative embodiment, the daily activation and deactivation of the system can be accomplished by a seasonally adjusted clock, rather than a photo cell. Once the system is activated during periods of light, the $CO_2$ levels can be registered by any one of a number of commercially available monitoring devices, such as the Fryrite II combustion analyzer manufactured by Bacharach, Incorporated located in Pittsburgh, Pa. When the $CO_2$ level falls below levels of optimal $CO_2$ concentrations in the field of plant growth, an electronic command is sent to compressors or fans that energize to pump additional $CO_2$-enriched air into the field. Commercially available wind speed and directional monitors also may be incorporated into such an electronic monitoring network. Increased wind speeds can then call for enriched or increased rates of delivery of $CO_2$ gas. Wind velocities above certain maximum values can trigger termination of the gas supply to minimize loses to atmosphere. The system can also be connected to an additional thermostat, such as a Honeywell Chronotherm III or Fryrite II, which can override the photocell, clock, and $CO_2$ monitoring activator and deliver warm gas to the field when the temperatures become too cold, especially during periods of darkness. Thus, delivering warm gas to the field can be electronically initiated by this overriding thermostat to prevent freezing of the crops, even if $CO_2$ uptake would be less than optimal.

In still another embodiment, the transmission lines, trunk lines, primary manifolds, and/or secondary pipelines can be used to deliver gas at an optimal temperature to the fields around 80 degrees Fahrenheit. Likewise, the pipelines can be use to deliver air above freezing temperatures to prevent killing frost, e.g., during night and early morning hours late in the growing season. In this case, the photocells which halt the delivery of gas during periods of darkness are electronically overridden by a thermostat that is also linked into the gas command system. When the temperature dips too low, the delivering of warm gas to the field can be initiated, even during periods of darkness, to prevent crops from freezing. The warm air can come from combustion sources, geological heat sinks or perhaps, more distant regions such as from more temperate southern climates like Texas. If a geological heat sink is employed, warm air can be pumped into an underground void during the hot summer months, heating the parent rock formation to provide heat to prevent frost formation in the fields by pumping gas heated in the rock formation into the fields in a cooler fall period.

If the field temperatures become too hot, i.e. greater than 80 degrees, the electronic thermostat can send a electronic command to the gas preparation center to deliver cooled air through the gate valve to the overheated crops. The cool air can be obtained through or from geological cool heat sinks or cool ground temperatures.

In still another embodiment the $CO_2$ and/or temperature-controlled gas can be delivered into plastic domes covering a row of crops. These domes will help retain the gas adjacent the plants to maximize the benefits to the plants.

In another embodiment, $CO_2$ gas is transported during the summer in the opposite direction of winter natural gas flow through large natural gas transmission pipelines. In this embodiment, $CO_2$ gas may originate from land-based producing sources and may be sent through idled natural gas pipelines, back out to off-shore gas production areas, where the $CO_2$ can be used to enhance aqua-culture growth of plants. (See FIG. 19.)

Alternatively, $CO_2$ gas may originate from land-based producing sources and be sent through idled natural gas pipelines, back out to off-shore gas production areas, where the $CO_2$ can be re-injected into oil wells to enhance oil flow rates and recovery. (See FIG. 17.)

If so desired, the $CO_2$ instead can be pumped through idled natural gas pipelines from land-based sources to ocean platforms or wells where it can be sequestered in clathrate form and stored harmlessly under the pressure of 500 to 1000 meters ocean depth, as known in the art and discussed in U.S. Pat. No. 5,397,553, incorporated by reference above. (See FIG. 18.) During the natural gas demand months when the pipelines are transporting natural gas inland again, these clathrates can be brought to the ocean surface where the $CO_2$ liberated from the solid clathrates can be used to enhance aqua-culture or delivered with the natural gas through the pipelines.

In another embodiment, the $CO_2$ can be pumped through idled natural gas pipelines from land-based sources to ocean gas platforms or wells, where it can be sequestered as solid clathrates and stored harmlessly under the pressure of 500 to 1000 meters ocean depth. During the natural gas demand months when the pipelines are transporting natural gas inland again, these clathrates can be brought to the ocean surface, where the $CO_2$ re-gasified from solid clathrates can be used to enhance aqua-culture. Alternatively, the clathrates can be containerized at depths of 500 to 1000 meters, transported to other regional remote sites from the off-shore production platform, and the $CO_2$ can be regasified to enhance plant growth or for injection into oil reserves to enhance oil recovery, or for refrigeration.

In another embodiment, LNG ships which are presently transporting LNG can be used to transport $CO_2$ when these ships aren't transporting LNG. The $CO_2$ can be contained either as a gas or a liquid in the pressurized super-cooled gas containment storage tanks used to hold LNG on board the ship. When the ship reaches a destination, the $CO_2$ can be injected into oil wells to enhance oil recovery, can be used to enhance aqua-culture or terrestrial plant growth, be used for refrigeration, or sequestered as clathrates in deep water. The ship can then be refilled with LNG. (See FIGS. 14–16.)

In still another embodiment, the $CO_2$ gas can displace liquid in a tanker truck and be backhauled to an agricultural use. (See FIG. 13.)

The present invention permits a farmer to reduce the distance between rows of crops as compared to existing row widths when the field is to be provided with elevated levels of $CO_2$. Additionally, when $CO_2$ is to be introduced into a field, the spacing between individual plants within a given row can be decreased. For instance, Lechuga Great Lakes, a typical lettuce, under normal conditions requires 3 centimeters between individual seed spacing and 46 centimeters between individual rows of seeds. A typical Kentucky Wonder variety green pole snap bean is normally seeded with 3–5" between individual seeds and around 3–4 feet between poles supporting bean plants. With CO2, this distance can be reduced by about 25%, thus increasing planting density. In the field and enhancing crop yields per unit area.

In a further embodiment, the farm implement towed behind a tractor can include spaces or gaps in the tooling on the implement to allow the tractor and implement to drive over the secondary exhaust pipeline rows, working the soil immediately adjacent both sides of the secondary exhaust pipeline rows without damaging the pipelines themselves. This allows the spacing between the secondary exhaust pipelines to be spaced in a substantially closer configuration providing for uniform distribution of $CO_2$ gas to the field of crops. (See FIG. 12.)

BRIEF DESCRIPTION OF DRAWINGS

FIG. 13 schematically depicts a cycle for using a tanker trailer cycle for a CO2 backhaul.

DETAILED DESCRIPTION OF THE PREFERRED EMBODIMENTS

Although $CO_2$ can enhance crop yields, constructing a national pipeline distribution network exclusively for $CO_2$ gas from $CO_2$ production sources to agricultural use markets would cost trillions of dollars and could easily take decades to construct. Further, given today's high cost of capital and restrictive environmental regulations governing pipeline construction, implementation of such a pipeline project exclusively for carbon dioxide gas delivery would be hard to economically justify. Utilizing existing natural gas transmission and distribution infrastructure that is underutilized during the summer crop-growing season in accordance with the present invention, however, could be implemented rapidly and extremely cost effectively.

One embodiment of the present invention provides for the transmission of both natural gas and carbon dioxide gas through the same pipeline, with natural gas being delivered during the peak heating demand months (e.g., November through March in northern climates or when the region's ambient temperature is below about 65° F.) and carbon dioxide being delivered during the summer growing season (e.g., April through October in northern climates.) Natural gas pipelines servicing countries in the southern hemisphere will operate in the same basic manner, but with the converse monthly cycle. The $CO_2$ can then be delivered to field crops to enhance plant growth at intermittent rural points all along the transmission pipelines.

Figure 1:
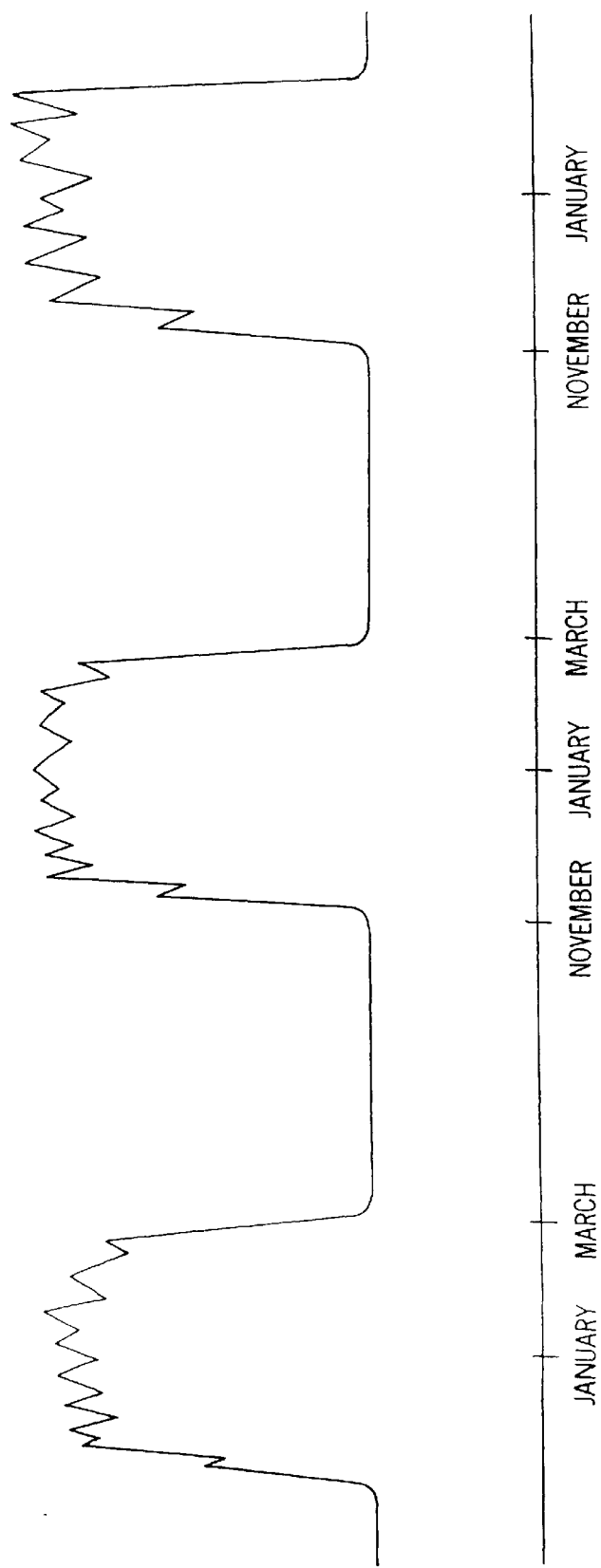
FIG. 1 is a graph schematically depicting the seasonal demands for natural gas pipeline utilization for northern hemisphere.
Figure 2:
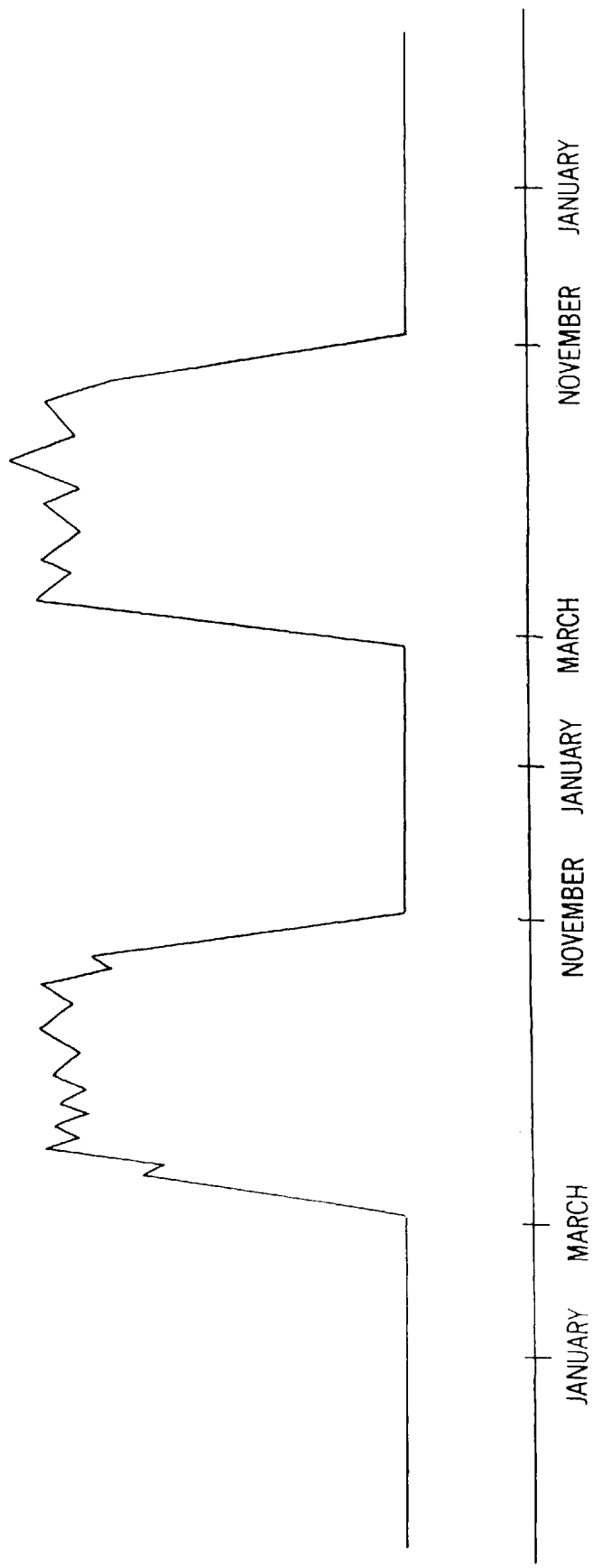
FIG. 2 is a graph schematically depicting the agricultural demands for $CO_2$ gas and pipeline utilization for northern hemisphere.
Figure 3:
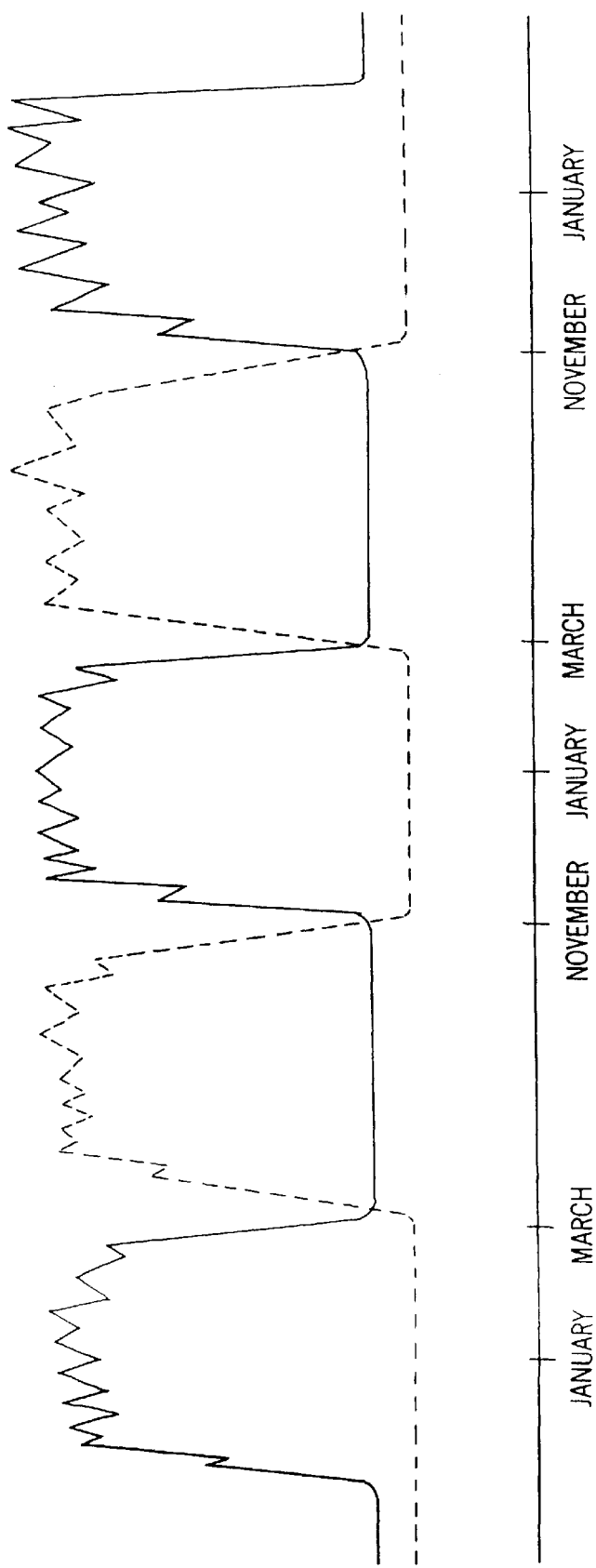
FIG. 3 is a graph schematically depicting the natural gas and $CO_2$ gas and pipeline utilization for northern hemisphere.
Figure 4:
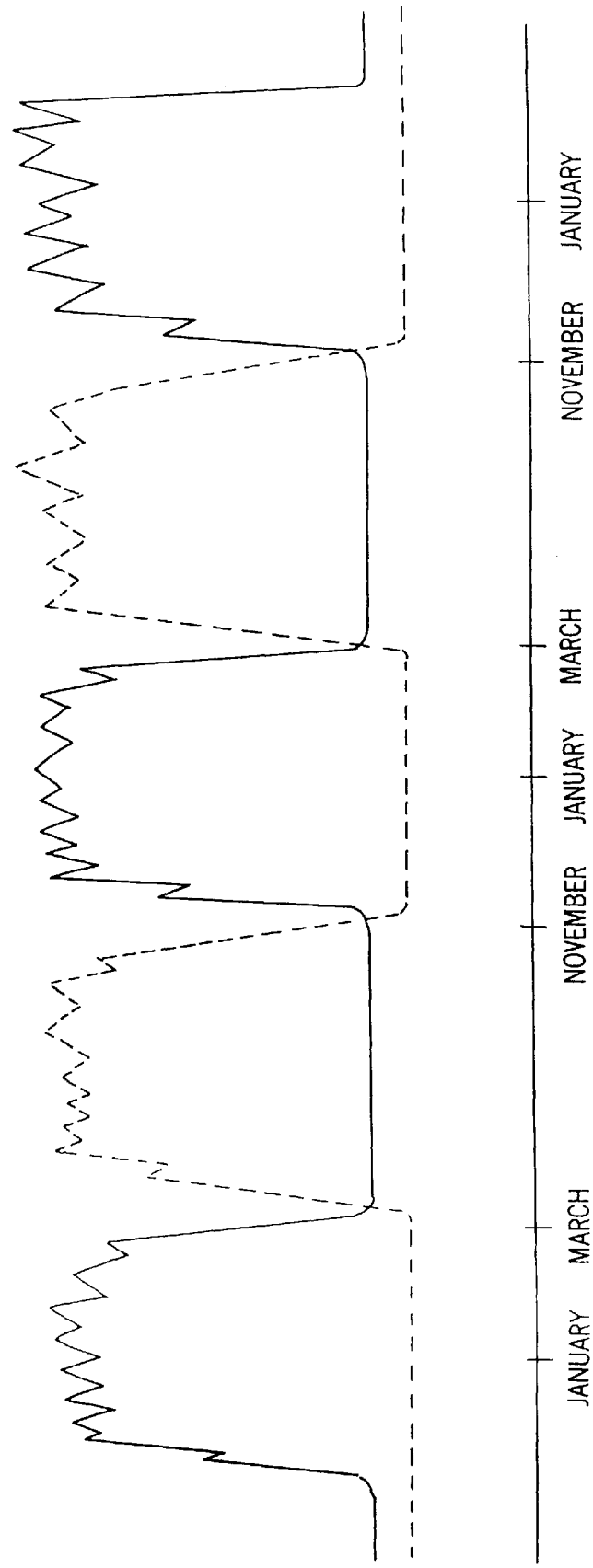
FIG. 4 is a graph schematically depicting the natural gas and $CO_2$ gas and pipeline utilization for southern hemisphere.

As weather forecasts predict regional warming and consequent plummeting demand for natural gas, the in-pipeline inventory of methane gas can be purged with increased concentrations of $CO_2$, or perhaps substantially pure $CO_2$. This purging can start at the origin of the transmission pipeline or at some secondary location. Purging before the actual fall in demand allows for the in-line inventory of methane gas to be sold before the weather warms, causing natural gas demand to drop precipitously for the year, as shown in FIG. 1. The $CO_2$ will progress throughout the length of the pipeline, eventually filling its entire long volumetric capacity and displacing the natural gas. In a preferred embodiment, the section of pipeline closest to the winter demand market is secured with a gate valve or the like from the $CO_2$ deliveries and the in-line inventory of methane near the end-use market is conserved. The $CO_2$ can be provided from geological reserves or natural wells of $CO_2$ that are commonly associated with natural gas-producing regions. Otherwise, $CO_2$ can be refined from the natural gas or oil deposits, as is known. Combustion sources or industrial processes—like the manufacturing of lime, cement, fertilizer, or fermentation—can also be $CO_2$ gas sources. The reverse process can be used to convert back to natural gas delivery as colder weather is predicted to return.

Figure 10:
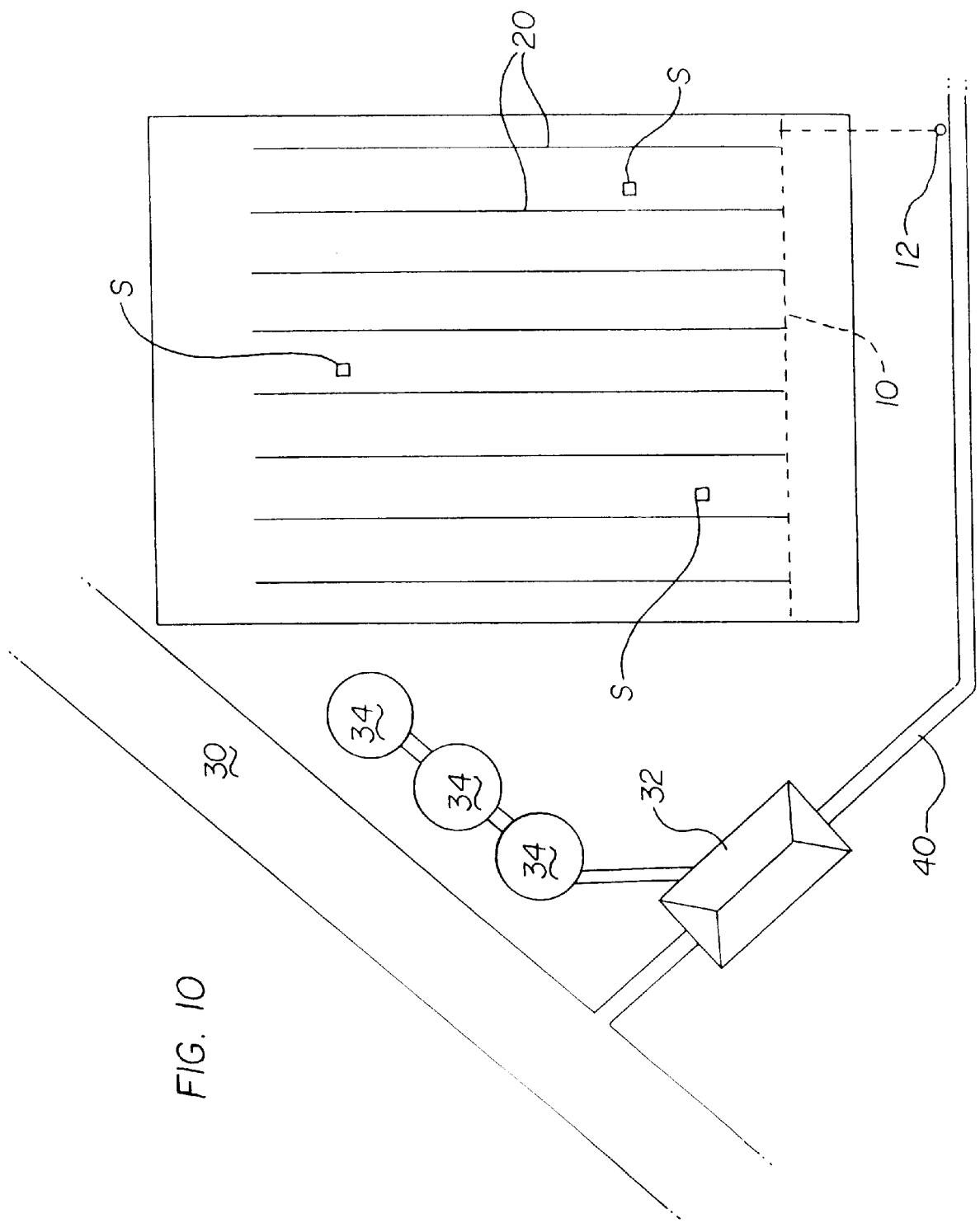
FIG. 10 is a schematic view a major natural gas transmission line connected to an agricultural gas preparation facility and thence to the $CO_2$ trunkline

In a second embodiment of the invention, as the demand for natural gas falls at the end of the ratio of $CO_2$ to methane in the pipeline is progressively raised to levels significantly higher than 1% $CO_2$ gas. The methane gas and $CO_2$ gas are then separated at a distant site, or a series of such sites, closer to the demand market for methane. As illustrated in the drawings (see, e.g. FIG. 10), the separation may take place at an agricultural gas preparation plant immediately adjacent the field. This preparation plant can separate out the $CO_2$ and return the unused methane fraction back to the pipeline for distribution downstream. The ratio of $CO_2$ to methane can continue to rise as demand for methane collapses due to warm weather until the pipeline is substantially filled with just $CO_2$ or an equilibrium between the ratio of methane and $CO_2$ in the pipeline matches the demand for the methane. Typically, the $CO_2$ will be a predetermined portion of the gas, with the $CO_2$ levels commonly being between about 3% and about 97%. The reverse process can be used to convert back to natural gas delivery as colder weather starts to return, with methane levels increasing and $CO_2$ levels decreasing until "pure" natural gas is being delivered again.

In another embodiment, natural gas transmission pipelines connecting off-shore production platforms to coastal natural gas markets can be utilized to deliver $CO_2$ during periods of low demand for natural gas. In one preferred arrangement, $CO_2$ produced from land-based sources are transmitted out to the off-shore platform, as suggested in FIGS. 17–19. As the $CO_2$ starts to progress towards the off-shore natural gas production platform, the in-line pipeline inventory of methane can be conserved at the platform by re-injecting it back into the geological reserve from which it came until the $CO_2$ arrives at the platform and occupies the entire volume of the pipeline. This back-delivery of $CO_2$ will typically be done during the months when natural gas is in peak demand, e.g. from November to March in the northern hemisphere.

During the months when natural gas is in higher demand, the pipeline can again be used to deliver natural gas. For example, in the northern hemisphere, flow back toward land can be started toward the end of March and continue until flow is again reversed to deliver $CO_2$ as discussed above. Similar to the reversal of flow when warmer weather approaches as outlined above, when natural gas delivery is reinitiated, the volume of $CO_2$ in the pipeline will be delivered back to land. This in-line inventory can be beneficially reused at the land-based site, stored for later delivery to the platform, or (less desirably, but perhaps acceptably) vented to atmosphere.

Once the $CO_2$ arrives at the platform through the pipeline, it can be used or stored as desired, but several advantageous options exist for handling this $CO_2$ gas. In a first such option, schematically illustrated in FIG. 19, the $CO_2$ can be introduced into a body of water to enhance aqua-culture growth such as algae, kelp or various desirable aquatic plant species. This can be done by bubbling the $CO_2$ through the water where the aquatic crop resides, such as by delivering the $CO_2$ through one or more sparge pipes (not shown) positioned below the surface of the water and having a plurality of orifices spaced along their lengths.

Figure 17:
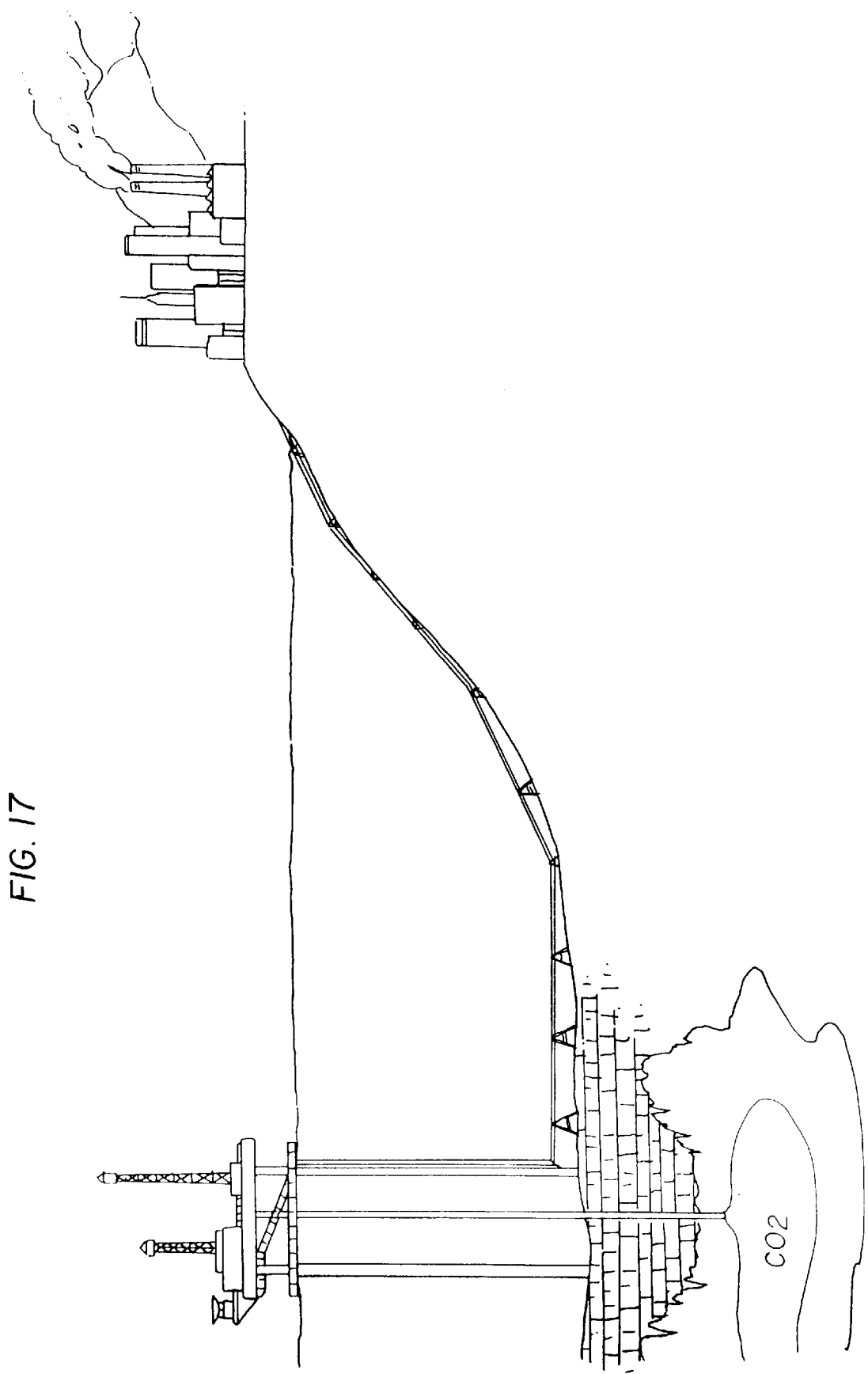
FIG. 17 schematically shows pumping of $CO_2$ to ocean-based sources for oil well re-injection.

In a second option, depicted schematically in FIG. 17, the $CO_2$ can be injected into an oil-containing geological formation, preferably one that lies in close proximity to the offshore platform. This is particularly practical if the platform is used to extract oil as well as natural gas because the $CO_2$ can be delivered directly into the oil reserve being tapped by the well. Delivering the $CO_2$ under pressure enhances flowability and oil production from the well; such a use of $CO_2$ is common practice in the industry when $CO_2$ gas is readily available.

Figure 18:
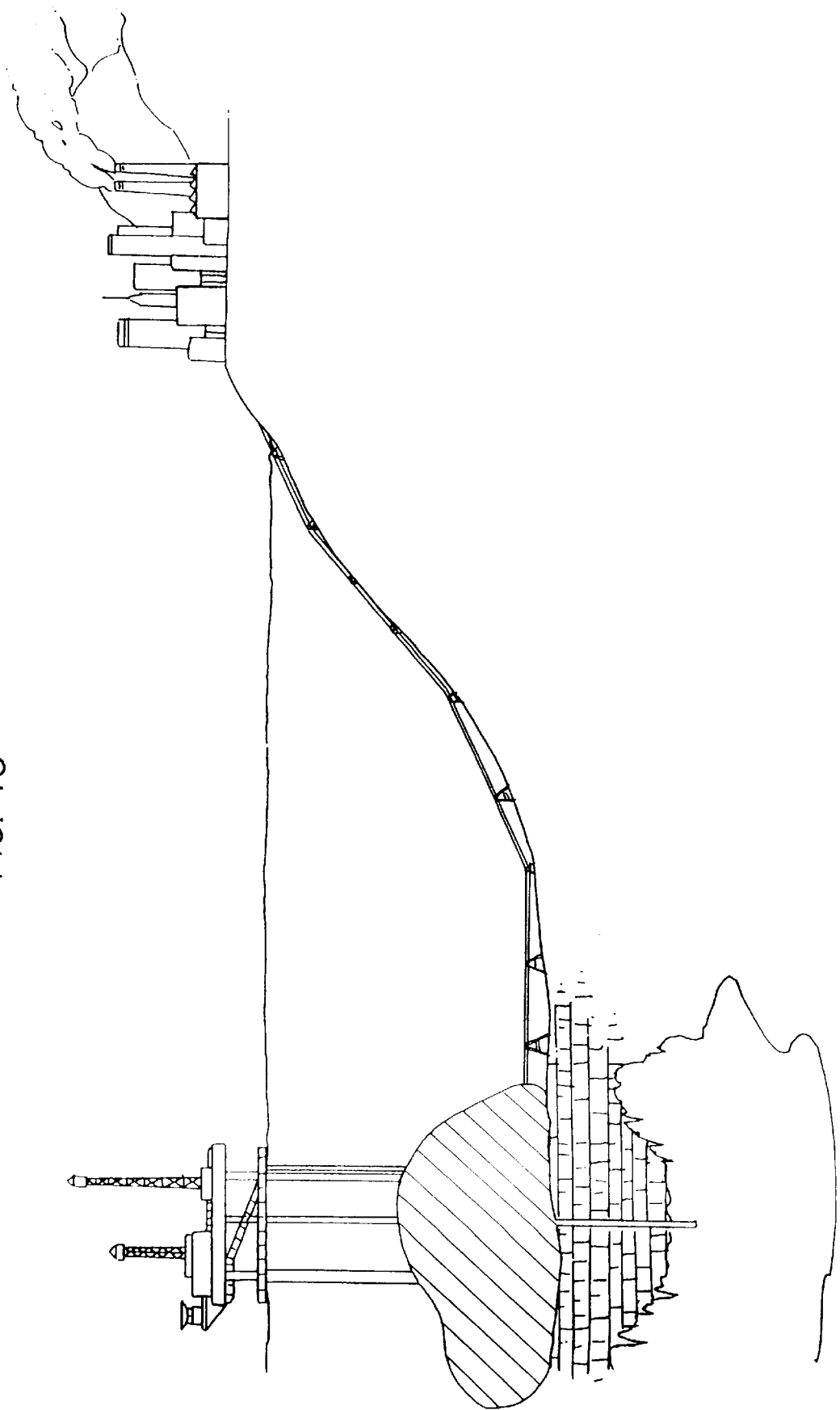
FIG. 18 schematically includes pumping $CO_2$ to ocean-based depositing as clathrates FIG. 19 schematically shows pumping of $CO_2$ to ocean-based sources used in aqua culture.
Figure 19:
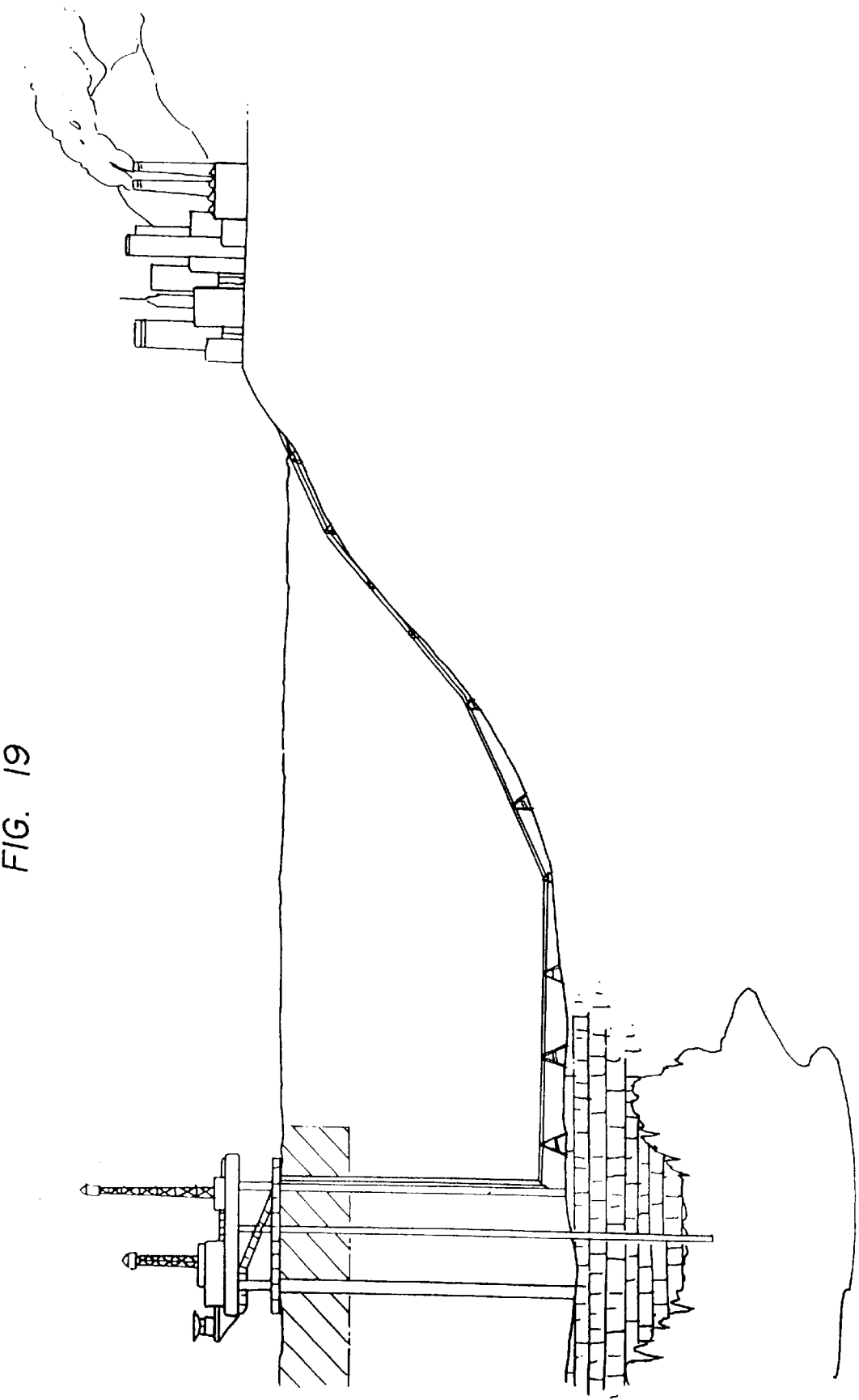

FIG. 18 schematically shows a third option, which appears to be most useful if the off-shore platform is situated in or near water which is about 500 to 1000 meters deep (and perhaps deeper). It is believed that delivering the $CO_2$ down to such depths will enable one to form solid clathrates from the $CO_2$. Such clathrates are advantageous in that they permit highly condensed storage of $CO_2$. These clathrates can be stored on the ocean floor until they are needed for some other purpose. If there is no use for the $CO_2$ at the storage site, the $CO_2$ can be delivered back through the natural gas delivery line to the land when the transmission capacity of the pipeline is not being fully utilized to transport natural gas. Methods for forming clathrates are known in the relevant art (see, e.g. U.S. Pat. No. 5,397,553, incorporated by reference above) and need not be discussed in great detail here.

In a further embodiment of this third alternative, the solid $CO_2$ clathrates are not merely stored on the ocean floor. Instead, the condensed solid clathrates can be containerized (i.e., placed into suitable storage vessels) at depths of 500–1000 meters, for example, and transported to remote locations where the $CO_2$ may be more beneficially used. Alternatively, the clathrates can be delivered through a pipeline at such depths to the desired destination. When the clathrates reach the intended destination, the clathrates can simply be brought back near the surface where the reduced water pressure will allow the clathrates to regasify, i.e. break back down into $CO_2$ and water. The liberated $CO_2$ gas may then be economically utilized for oil well injection, plant growth enhancement or other industrial purposes like refrigeration.

A different embodiment of the invention, various aspects of which are schematically illustrated in FIGS. 5–12, provides a system for using $CO_2$ to enhance the growth of crops in fields. In accordance with this embodiment, a primary gas manifold 10 is provided adjacent a field of crops. Secondary exhaust pipelines 20, which typically will have a smaller diameter than the primary gas manifold, can be in fluid communication with the primary gas manifold and extend out into the field. These secondary exhaust pipelines 20 extend across the surface of the field and serve to deliver gas to the plants in the field. To ensure thorough coverage of the plants, the secondary exhaust pipelines desirably extend nearly the entire length of the field, as shown in the drawings, and are positioned between adjacent rows of crop plants (omitted from the drawings for purposes of clarity) in the field.

Figure 5:
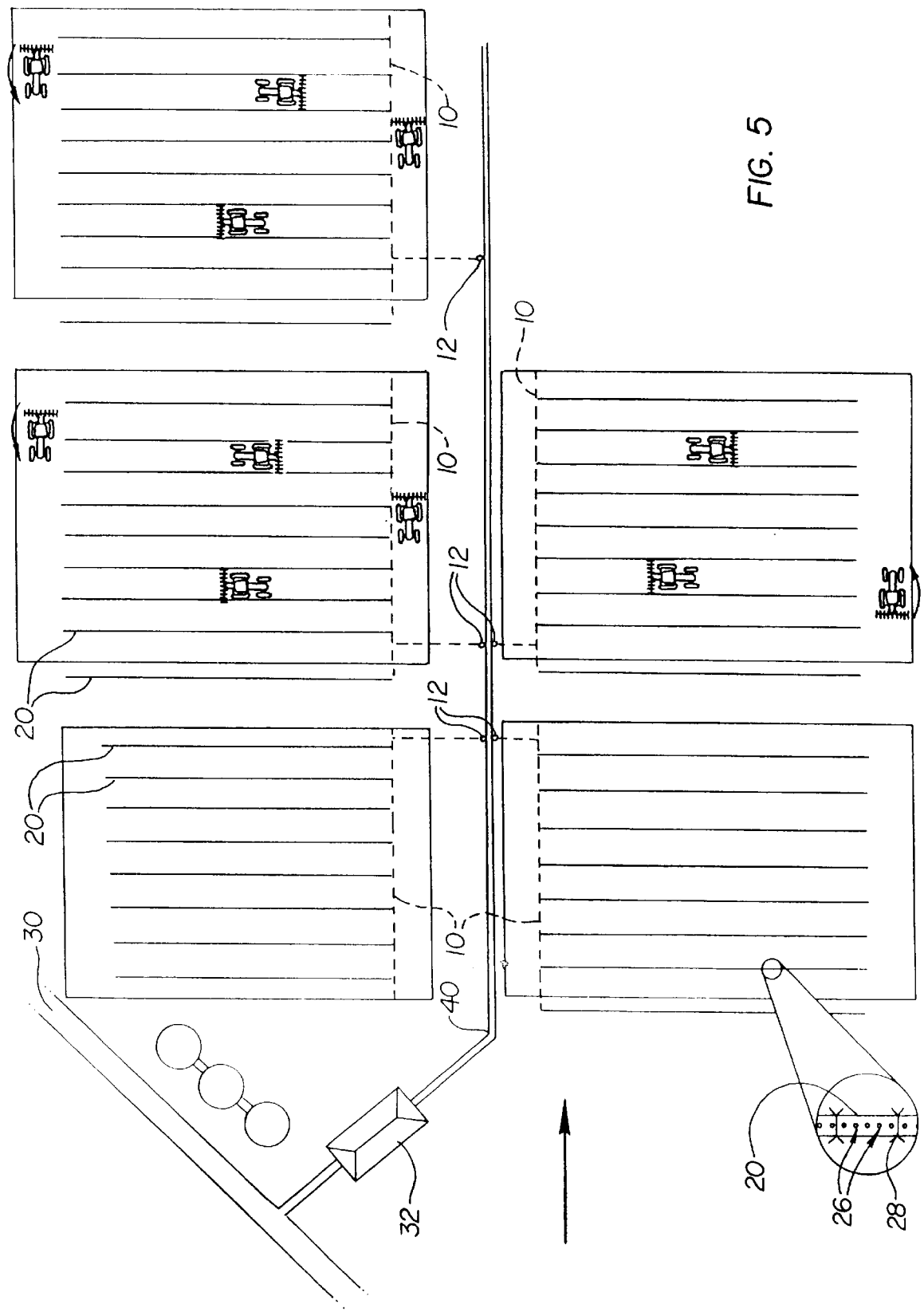
FIG. 5 schematically shows trunk lines linking transmission lines to a primary buried manifold connected to secondary exhaust pipelines which distribute $CO_2$-enriched gas and/or temperature control air to field crops.

Although the layout of the land or other practical considerations may dictate otherwise, the crops are desirably arranged in rows that extend generally perpendicularly to the "prevailing wind direction" at the site, illustrated in FIG. 5 by the arrow W. Obviously, the direction of wind currents across the field will change over time. However, the historic weather patterns of may areas indicate that weather systems and wind will more frequently move in a certain general direction. This direction is referred to herein as the "prevailing" wind direction. To the extent that this prevailing wind direction may shift from season to season, the crops optimally are oriented generally perpendicularly to the prevailing wind direction at the site during the growing season. With the secondary exhaust pipelines positioned between adjacent rows of plants, the plants will help shield the pipelines and the gas they are delivering from the wind, reducing dissipation to the atmosphere at large and keeping a higher $CO_2$ concentration adjacent the plants.

In one useful embodiment, the primary gas manifold 10 can extend generally parallel to one end of the field with rows of crops extending generally perpendicular to the primary manifold. In such an embodiment, the secondary exhaust pipelines 20 can extend into the field from the primary manifold with the exhaust pipelines being arranged generally at right angles to the primary manifold 10. If the rows of crops, and the exhaust pipelines 20 disposed therebetween, are oriented generally perpendicular to the prevailing wind direction during the growing season, the primary manifold 10 may extend in generally the same direction as the prevailing wind direction.

The primary gas manifold 10 may be connected directly to a main gas pipeline 30 and deliver the gas directly to the secondary exhaust pipelines and thence to the fields. It may be more economically feasible, however, to connect a plurality of primary gas manifolds to an intermediate trunkline 40 and connect the trunkline to the main gas pipeline 30. The trunkline 40 desirably extends through a relatively large field of crops or between several fields of crops, supplying a number of primary manifolds 30 along the way.

The trunkline 40 can be directly connected to the pipeline 30, but this will depend at least in part on the nature of the gas being delivered through the pipeline. If one can be fairly certain that the gas is essentially free of toxic or explosive compounds (e.g. residual volumes of methane) when $CO_2$ is to be delivered to the crops, the trunkline can be advantageously connected directly to the major pipeline 30. If not, it would be advisable to include an agricultural gas preparation plant 32 to treat the gas from the main pipeline, perhaps before delivery to the trunkline 40. The gas preparation plant 32 can separate out $CO_2$ from any remaining methane or other undesirable gases. Alternatively, the gas preparation plant 32 could simply pass the gas through a combustion chamber to ensure that any remaining methane in the gas is burned before the gas is fed into the trunkline 40 for delivery to the field.

The trunkline 40 can be oriented in any direction which is convenient. For example, the trunk line may simply be oriented parallel to a road or the like. In the illustrated embodiment, the trunkline 40 extends relatively straight along much of its length in a direction generally parallel to the primary manifolds 20. In this case, the primary manifolds would need short spur lines connecting the primary manifold to the trunkline. If so desired, the trunkline 40 instead can be oriented generally perpendicular to the regionally prevailing wind during the growing season. A series of primary manifolds 10 can then extend laterally from opposite sides of the trunkline in a direction generally perpendicular to the prevailing wind direction.

The trunklines 40 may preferably be buried beneath plow depth in the field to avoid having plows or other common farm implements rupture the trunklines. "Normal" plow depth varies from region to region and, to an extent, from crop to crop. In the United States, for example, normal plow depths are commonly between seven and nine inches, so the trunklines are advantageously buried at least a foot below ground level. The primary manifolds 10 extending from the trunklines 40 preferably also are buried below plow depth under a field of crops. The secondary exhaust pipelines 20 extend from the associated primary manifold 10. If the primary manifolds are so buried, at least one end of each of the secondary lines start buried below ground level.

A typical tractor has an axle width of 85 inches. 4-wheel drive articulated tractors have axle widths of 120–128 inches. Both typically have a turning radius of 14–16 feet. (These dimensions are typical for tractors in common use in the United States. Although the dimensions themselves may differ in different countries, converting the invention for use with other dimensions is well within the skill of the practitioner.) Tractor wheel spacing provides for typically two rows of crops between the tires. If the tractor has dual tires this remains the same and the dual set of tires each drives in between a row of crops shoring the middle row.

At ground level, the secondary exhaust tubes 20 optimally are spaced away from the edge of the field a distance slightly greater than the width of the widest piece of equipment the farmer must use in the field. If the primary manifolds 10 are positioned immediately adjacent the very edge of the field, each of the secondary exhaust pipelines can extend this distance below plow depth before extending up to the surface. Such an arrangement is illustrated at the lower left field in FIG. 6. More preferably, though, the primary manifolds 10 are positioned beneath the field to be treated and are spaced from the edge of the field about the width of the widest piece of equipment, as illustrated in FIG. 5, so the exhaust pipelines 20 can be made shorter. This permits the farmer to tend the crop, such as by disking or raking, and turn the tractor through its normal radius of turn without having to back up and/or jockey the implement at the end of each row of the field.

Commonly, the widest piece of machinery is the farmers "disking" apparatus that is towed behind the tractor; such disking implements are typically no wider than 20 feet. Therefore, the secondary pipeline desirably surfaces at a location spaced from the edge of the field by at least 20 feet, and desirably a little farther to permit a little extra distance for the radius of turn, providing a margin of error for the farmer who might be driving the tractor in muddy, slippery soils. This will allow the farmer to till up to the end of the field and turn his tractor and equipment around to perform another pass down the length of the field in the opposite direction, as is his normal course. Once the secondary exhaust tubes near the opposite edge of the field, these secondary exhaust tubes desirably stop short of that edge by about the same distance (a little over 20 feet in this example), once again allowing the farmer's tractor and its attached appliance to maneuver effectively at the far end of the field, i.e. turning around to plow, till or the like back up the field in another corridor. Spacing the secondary pipelines from the edges in this fashion provides for a "cushion" of room for the radius of turn of the equipment at both ends of the crop fields.

Figure 6:
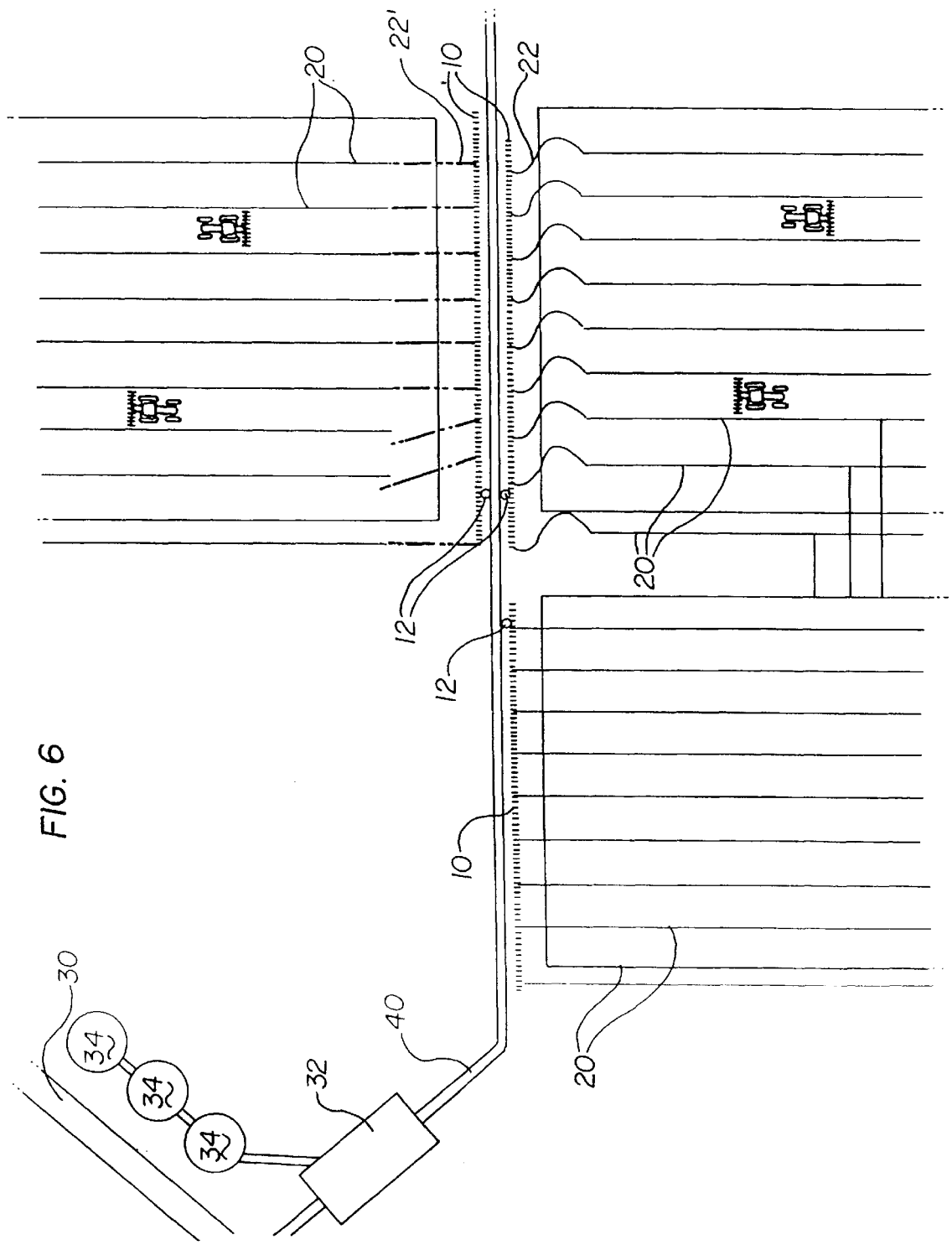
FIG. 6 schematically depicts a primary manifold positioned connected to the secondary exhaust pipelines on a variety of ways.
Figure 7:
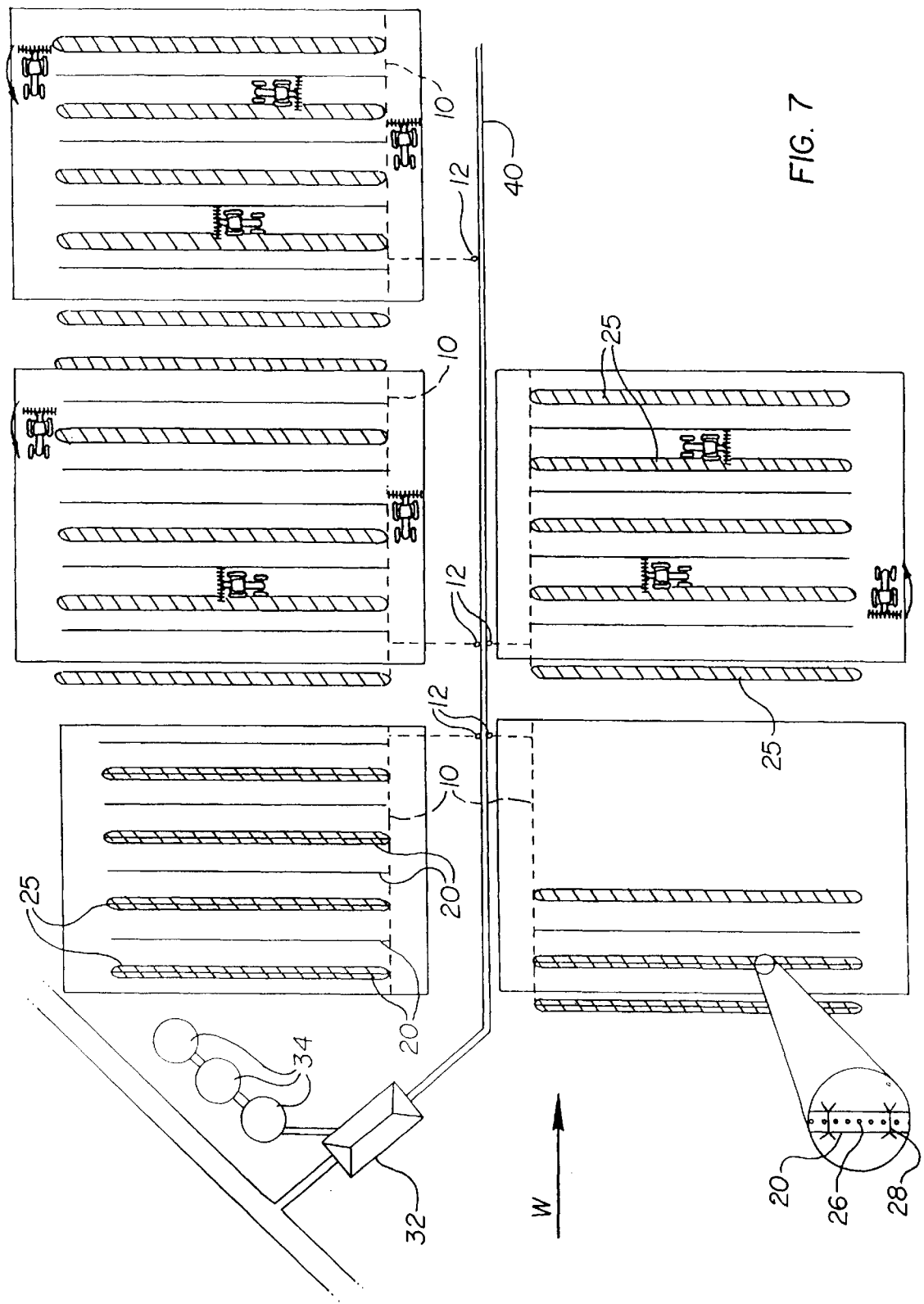
FIG. 7 schematically depicts secondary exhaust pipelines located in untilled rows between sheltering rows of trees.

In an alternative embodiment shown in the bottom right field in FIG. 6, the secondary exhaust pipeline 20 can be suspended above ground level from a trestle 22 at the end of the field adjacent the primary manifold 10. The secondary exhaust pipeline should be suspended high enough to allow the farmer's tallest tractor to drive underneath it and widely enough to permit the widest implement to pass underneath while the farmer makes a normal turn at the end of a row of crops with his equipment. After the suspended distance which allows the tractor and implement to efficiently turn at the end of the field, the secondary exhaust pipelines descend back to the surface of the field where the pipelines can deliver gas to the field of crops. At the end of the field opposite the primary manifold, the secondary tubes may stop short of the edge of the field by a distance determined by the width and turning radius of the farmers' equipment, as in the previous embodiment.

Another third embodiment of a connection between the primary manifold 10 and the secondary exhaust pipelines is shown in connection with the field in the upper right portion of FIG. 6. In this arrangement, the exhaust pipelines are connected to the primary manifold by detachable, movable connecting lengths 22' at the end of the field adjacent to the primary manifold. When a farmer wants to enter the field with a tractor, the connecting lengths 22' are temporarily disconnected from one or both of the associated secondary pipeline 20 and the primary manifold. If completely disconnected, they may be temporarily removed from the field. If not, they may be pivoted about the remaining connection to move them out of the way so a farmer can make a normal turn with his tractor and implement at the end of the field. The connecting lengths 22, therefore, desirably are at least as long as—and more preferably a little longer than—the width of the farmer's widest implement. At the end of the field opposite the primary manifold, the secondary exhaust pipelines may stop short of the edge of the field by a distance determined by the width and turning radius of the farmers equipment, as in the previous embodiments or, alternatively, the exhaust pipelines may be provided with distal lengths which also can be displaced.

The secondary exhaust pipelines 20 are desirably attached to the primary manifold at about equal distances, normally several furrow widths to allow tractors to navigate the field effectively. Alternatively, an additional tube can be spaced in a furrow that will pass between a tractor's tires down the middle of the axis length of the tractors. This will provide the greatest coverage of gas across the width of the field, while allowing the farmer to move up and down the field at length without disrupting his normal tasks of disking, plowing, seeding, harvesting, etc.

The secondary exhaust pipelines 20 may be allowed to rest in an untilled area that the farmer can dedicate to growing trees, shrubs, etc. This protective strip or "shelter belt" (25 in FIG. 7) shields the secondary gas pipeline rows from displacement by wind storms, guide the farmer, help conserve water, prevent wind and water erosion, provide wildlife habitat, and shelter the crops from the wind. Such shelter belts 25 also enhance the absorption of the $CO_2$-enriched gas by the plants because they reduce wind turbulence adjacent ground level. The secondary exhaust pipelines 20 may be attached to the trees within the shelter belts to prevent the light-weight pipes from being displaced by high winds or plowing.

If so desired, the tractor can be equipped with a device to steer the secondary exhaust pipelines 20 out of harm's way of the plows, disks, harvester etc. This permits the farmer to drive over the tops of these lines while working the land around the secondary exhaust pipes and/or in adjacent furrows. In the preferred embodiment, the secondary exhaust tubes would be channeled in a furrow through the appliance working up the length of the field. Alternatively, this device could pick the secondary pipe up and allow the appliance to run underneath it and then set it back on the soil behind the appliance. In the preferred embodiment, however, the secondary pipeline is not moved and is in a dedicated corridor that is left untilled.

The close-ups of the secondary exhaust pipelines 20 in FIGS. 5–9 show a series of exhaust ports 26 spaced along the tops of these pipelines. Either instead of or in addition to such upper exhaust ports, the secondary exhaust pipelines may be provided with lateral exhaust ports (not shown) to better distribute the enhanced gas mixture longitudinally into the field of crops. This will help ensure that rows of plants spaced farther away from the exhaust pipeline (e.g., in a tilled corridor running parallel to the secondary exhaust pipeline) still received enhanced levels of $CO_2$. Both the upper exhaust ports 26 and these lateral exhaust ports can be spaced along the entire length of the pipeline.

In another alternative embodiment not specifically shown in the drawings, the secondary exhaust pipelines 20 can be buried below plow depth across the length of the field. In this scenario, intermittent exit points would be provided down the length of the exhaust pipelines. This could involve permanent stand pipes around which the farmer could plow or mechanically retractable pipes that would retract into the ground below the depth of a plow so the farmer could work the soil over the top of the device and during the growing season it could "pop up" to distribute gas.

The present invention also provides a method to maintain optimal temperature and $CO_2$ concentration of the atmospheric gas mixture surrounding the crop's canopy to increase crop yields. This can involve warming crops to optimize photosynthesis by transmitting warm air to farmers. Alternatively, warm air from the temperate regions to higher latitudes and/or elevations can be transmitted and thinly distributed (piped) to farmers along the transmission corridors to maintain crop temperatures just above freezing during periods of early killing frost, allowing farmers to avert early crop failure and extend their growing season up to six weeks or more. If heat loss from the pipelines is too great to maintain temperatures over long distances, the pipelines may be insulated. In addition, the gas is being delivered to the field through buried main gas pipelines 30, buried trunklines 40 and buried primary manifolds 10. This will tend to heat (or cool) the gas being delivered toward the average ground temperature, which is typically about 55 degree Fahrenheit only a little below the surface of the ground, and this may well be sufficient to keep plant crops from freezing.

This method of the invention also provides for optimal gaseous enhancement of the plant canopy stratum, establishing an optimal micro-climate zone extending over an agricultural field of crops or trees. This includes delivering optimum temperature, and optimum $CO_2$ composition of the gas mixture available to the leaves for growth throughout a 24 hour and seasonal period.

A further embodiment desirably includes an electronic monitoring and control system which governs the rate of delivery of $CO_2$ to plants through networked field monitoring devices connected to a governing control and a series of valves 12 on the primary manifolds. The operation of one optimal embodiment of such a control system is schematically depicted in FIG. 11.

Figure 11:
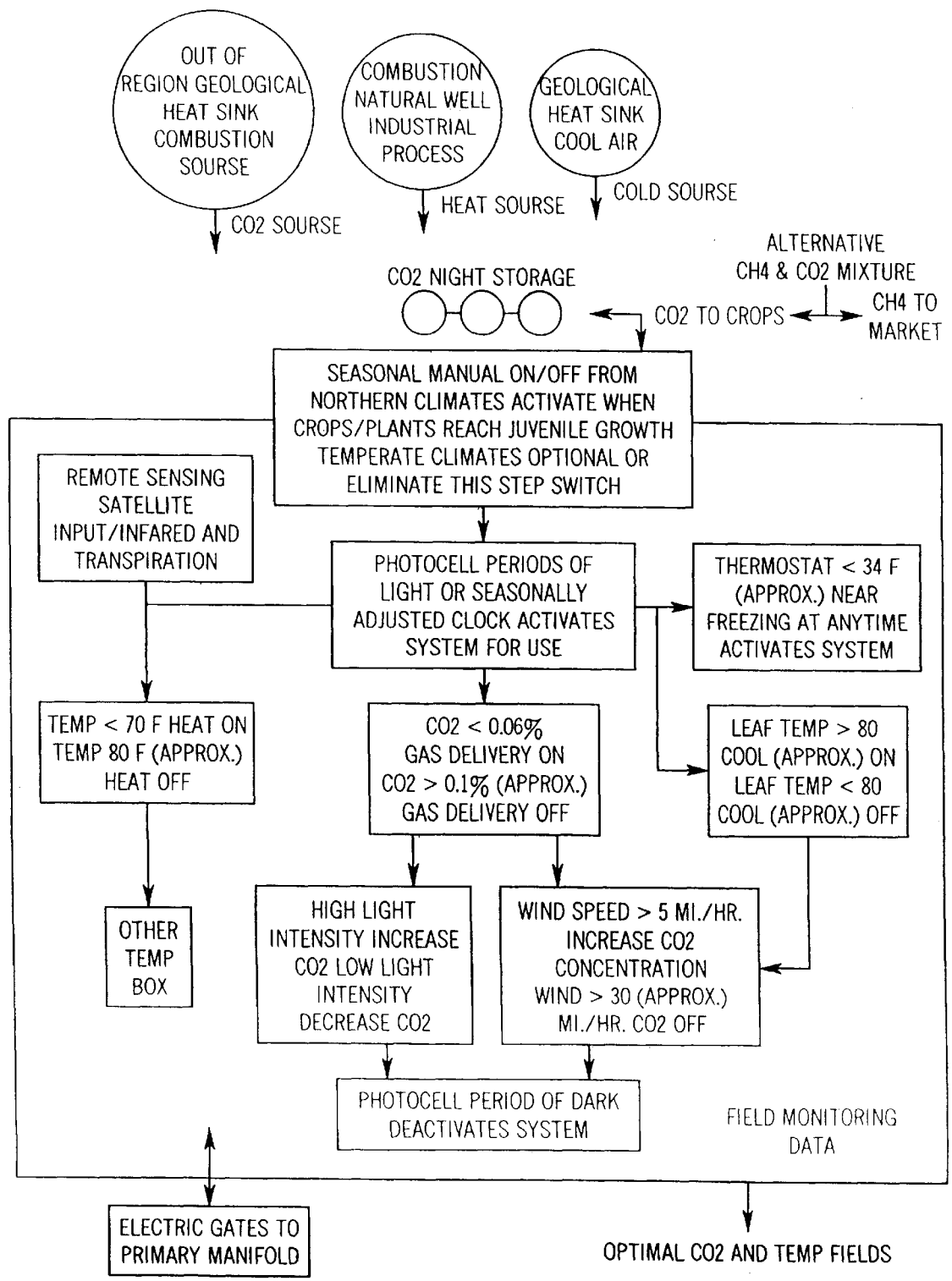
FIG. 11 is a flow chart showing one useful electronic monitoring and control schematic to optimize delivery of gas to the fields.
Figure 12:
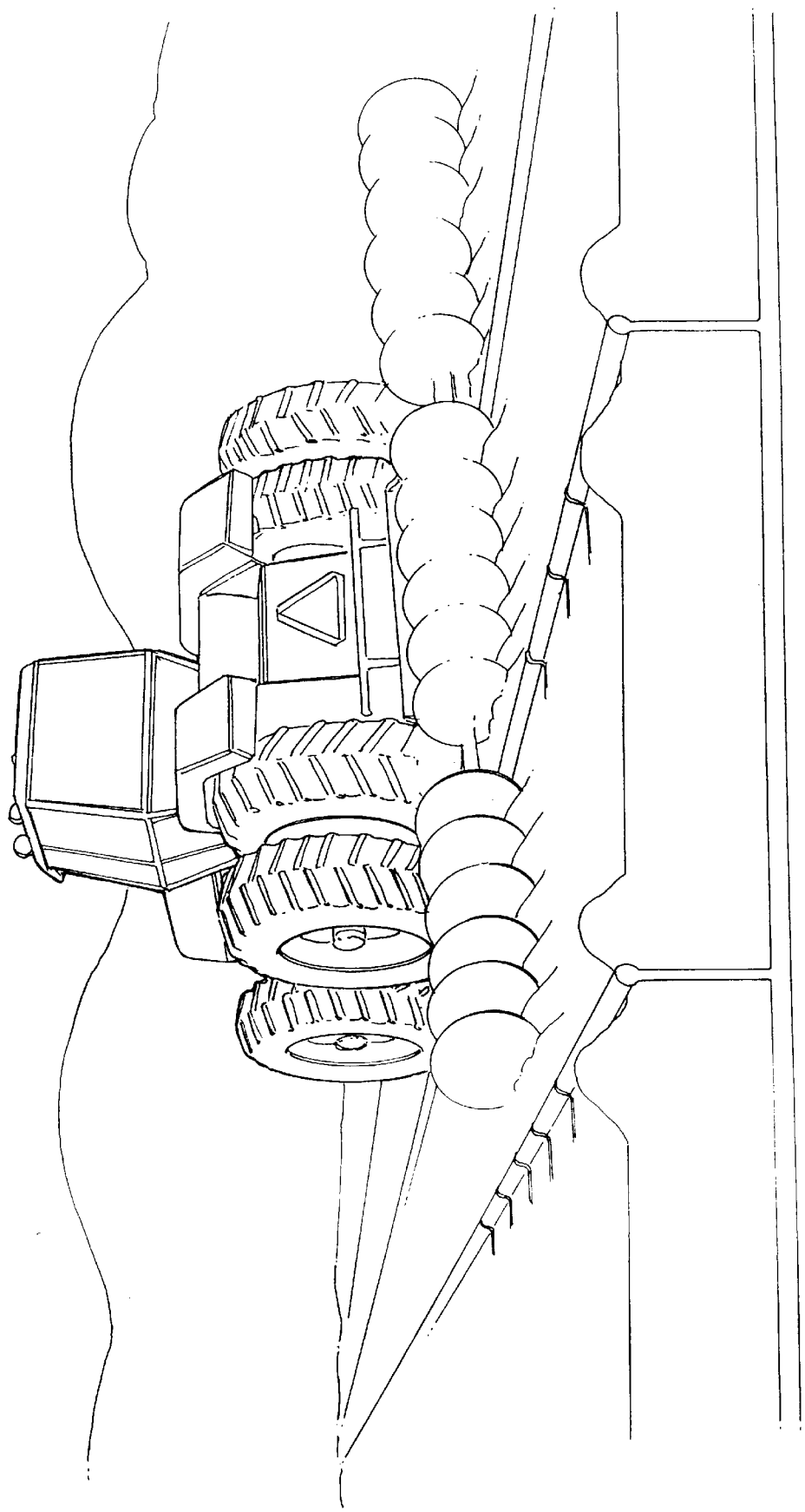
FIG. 12 schematically shows a farm implement driving over the secondary exhaust pipelines in the filed.
Figure 14:
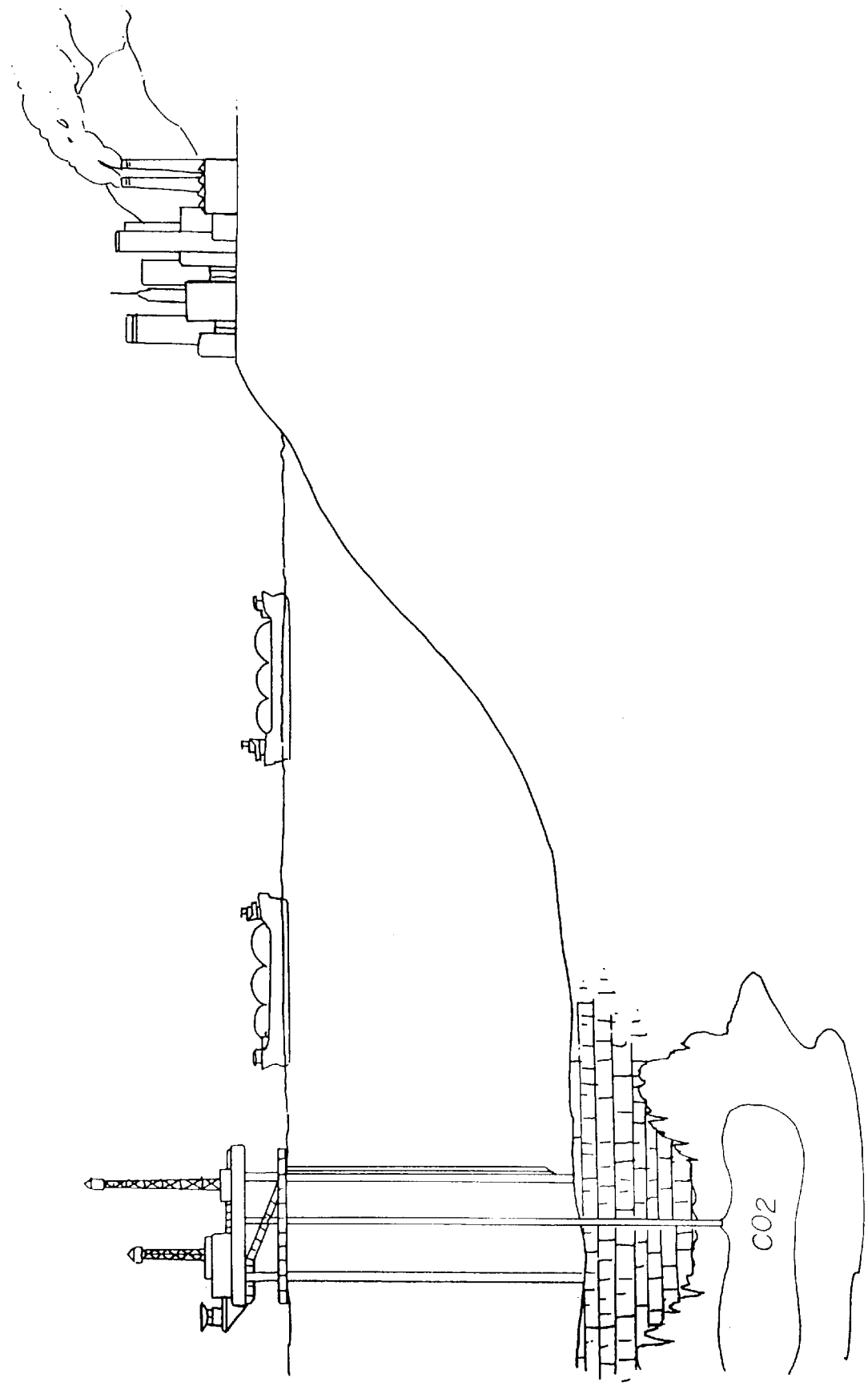
FIG. 14 schematically shows LNG shipping $CO_2$ to ocean-based sources for oil well re-injection.
Figure 15:
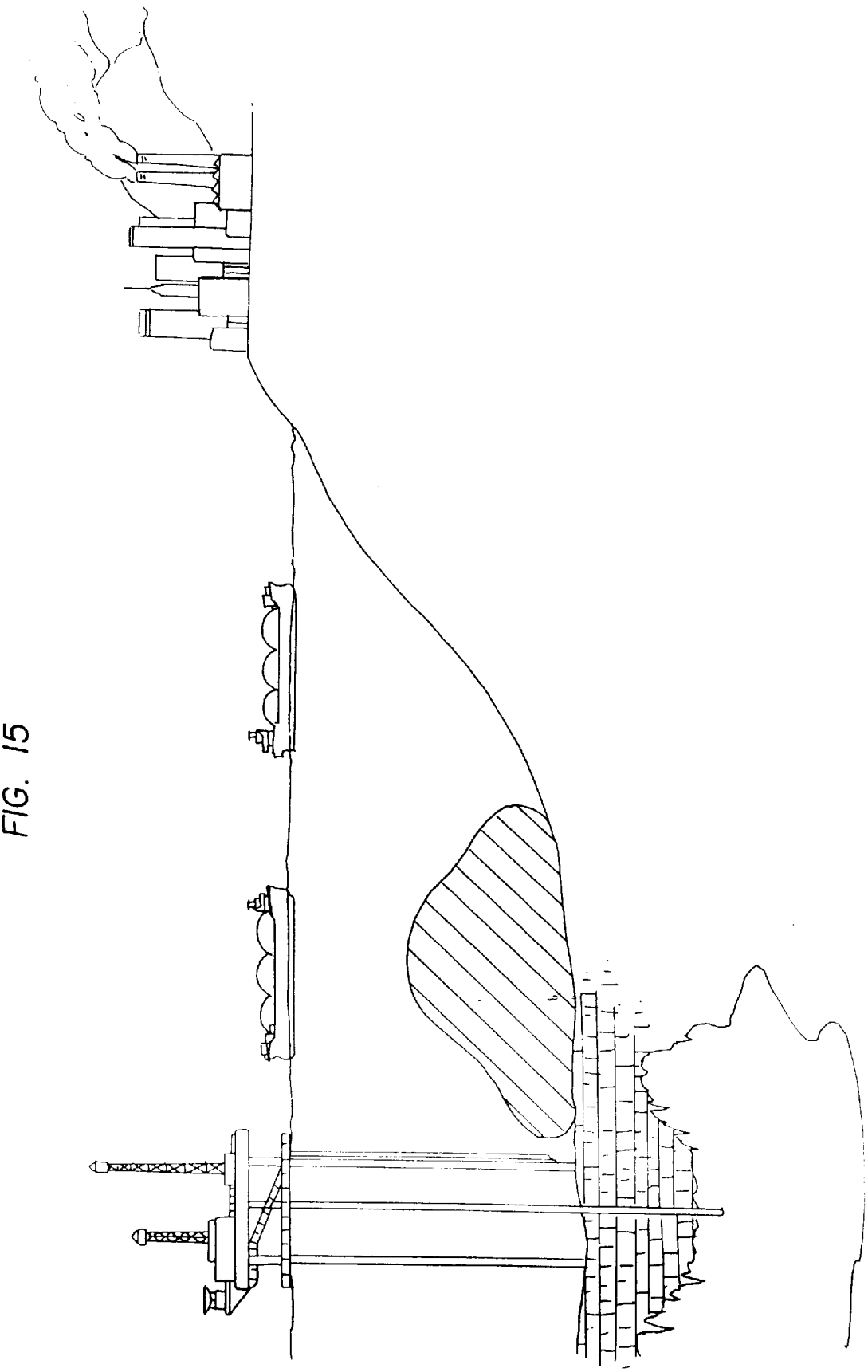
FIG. 15 schematically includes LNG shipping $CO_2$ to ocean-based sources for deposition as clathrates.
Figure 16:
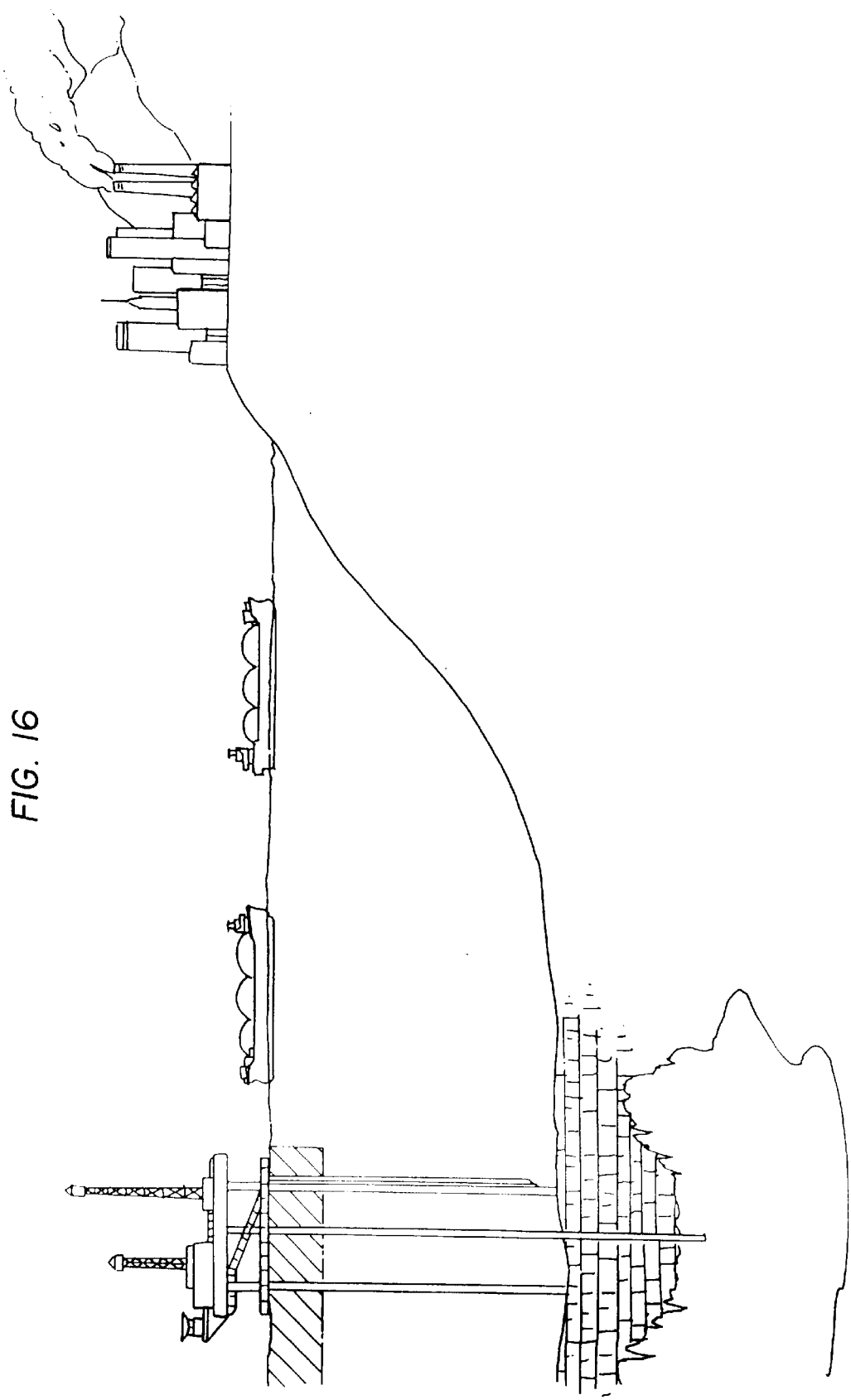
FIG. 16 schematically includes LNG shipping $CO_2$ to ocean-based sources for use in aqua culture.

The control system illustrated in FIG. 11 utilizes five control parameters including overrides. A first control parameter is a manual switch which allows the entire system to be completely shut down during the winter and to be activated when the crops reach a juvenile stage, which varies from species to species, but will typically be approximately three inches to six inches in height. In temperate climates where the growing season may be year-round this manual control can be left activated year-round.

Plants undergo photosynthesis and require $CO_2$ for this process only during periods when exposed to light. Hence, a second control parameter is the detection of sufficient light to support photosynthesis. A light-sensitive electronic device may shut off delivery of $CO_2$-enriched gas when there is insufficient light, e.g., at night.

A plant's rate of photosynthesis is typically proportional to the intensity of the sunlight—the more intense the light, up to a certain threshold, the greater the rate of photosynthesis. For example, during reduced photosynthesis due to a cloudy day the plants can assimilate less $CO_2$ than they would on a sunny day. Hence, a third control parameter will suitably control the amount of $CO_2$ introduced to the plants in proportion to the intensity of the light.

A fourth parameter of the system shown in FIG. 11 relates to the fact that the plants' rate of photosynthesis is directly proportional to the air temperature around them. Once again, there is an important threshold point which may vary from specie to specie, but generally is around 80 degrees Fahrenheit. Above this temperature, photosynthesis is dramatically reduced and photosynthesis tends to increase at predictable, essentially linear rates. Therefore, controls should link and delineate necessary increased gas delivery rates linearly up to about 80 degrees (or whatever temperature is appropriate for the crop at issue) an then should decrease as the plants' leaf surfaces exceed optimal temperatures. The third and fourth parameters are correlated as days of high light intensity may increase leaf temperature beyond the 80 degree threshold while the ambient air may be cooler. The electronic control device should be able to compensate for this relationship.

Fifth, wind velocities will have a direct bearing on the concentrations of $CO_2$ available under the plants' canopy particularly at the leafs stomata openings, where plants absorb $CO_2$ gas. On very windy days, there will be turbulent atmospheric gases both at the stomata opening and under the canopy, driving $CO_2$ levels towards ambient concentrations of about 0.03%. However, gas concentrations gradients surrounding the stomata will be reduced through turbulent air mixing. Therefore, larger amounts of $CO_2$ may be introduced in high wind conditions to compensate for the tendency of the wind to dissipate the enhanced $CO_2$ levels beyond the plant canopy zone and therefore reduce the crop's ability to absorb available $CO_2$ gas. In particularly high wind conditions (e.g. a storm), $CO_2$ gas delivery may be halted altogether.

Under calm/low wind conditions, turbulence will be at a minimum and a gradient deficit of $CO_2$ will form across the plants' stoma openings and may spread to a wide vertical deficit of the gas below 0.03% within and below the crops'canopy of leaves. This gas deficit condition will severely reduce the plants' rate of photosynthesis. Thus, $CO_2$ gas levels should be maintained at consistent dosages to maintain elevated levels, desirably around about 0.06%. In an alternative embodiment or as supplementary input to the electronic controls, the plants' photosynthetic rate and need for $CO_2$ can be determined by measuring transpiration, i.e., the plants water loss through leaves. This is commonly done by remote satellite imaging. Transpiration increases with photosynthetic rates, so this may provide a good mechanism to monitor and control the optimal flow of enhanced levels of $CO_2$ gas to a field of crops or region controlled by a field $CO_2$ gas preparation unit. It is important to note, though, that CO2 enrichment will reduce transpiration, so appropriate $CO_2$ concentrations for given transpiration rates will need to be determined by some simple experimentation, but such simple experimentation is well within the skill of an average artisan.

Optimally, a control system of the invention has the ability to monitor one or more of the above mentioned variables from any of a number of locations within a field or region. For this purpose, a number of electronic field monitoring stations S can be spaced around the field. This permits the system to automatically monitor conditions and control delivery of an appropriate amount of $CO_2$-enriched gas. The gas is delivered through a distribution system over a period of time and the $CO_2$ and temperature levels over of a field or even an entire agricultural region are controlled to optimize the photosynthetic rates of the plants.

Therefore, the present invention automatically monitors and then controls the flow of $CO_2$-enriched gas to a field of crops to optimize the plants' photosynthetic response under a wide variety of atmospheric conditions. The control system desirably includes the capability of controlling blending ratios of $CO_2$ gas with ambient air as well as blending gas to achieve optimal temperatures based a various monitored data. The present embodiment links a number of otherwise unrelated electronic monitoring devices in a unique manner to automate gas delivery to a field of crops or trees.

Another aspect of the present invention provides an agricultural gas preparation plant 32 for conditioning the gas to be delivered. This gas preparation plant should have the capability to control and change blending ratios of gases based on real-time monitored parameters from various individual locations in the field of crops. The individual field monitoring stations S can feed electronic data to the central gas preparation plant including $CO_2$ gas concentrations, photosynthetic rates, wind speed and direction, sunlight intensity, and ambient temperatures. These parameters are desirably measured both above and below the crop field's plant canopy. These parameters may be monitored electronically remote from the gas preparation site.

The gas preparation facility 32 has a trunkline 40 or other source of gas with either elevated $CO_2$ levels or, more desirably relatively pure $CO_2$. If the main gas pipeline 30 delivers $CO_2$ in conjunction with methane gas, the $CO_2$ can be separated from the methane before the $CO_2$ gas is mixed by the gas preparation facility. The gas preparation plant may also be provided with input sources of cool air and heated air. ("Cool" and "heated" are relative terms and a single-temperature source, such as a 55-degree gas supply from an underground pipe as mentioned above, may be "cool" when the ambient temperature is higher, such as above 80, and "heated" when the ambient temperature is lower, such as when frost is imminent.) The gas preparation facility may achieve this objective by controlling the rates of flow of prepared irrigation gas to the independent fields of crops through remote control access of the individual primary manifold valves 12 and controlling the openings aperture size of the gate valves.

The electronic control system desirably has the capability of optimizing the delivery of $CO_2$ and enhanced gas between fields by a series of remotely controlled valves 12 that can be shut on and off, with variable settings in between to control gas delivery rates to the fields. The gas preparation facility may be capable of delivering $CO_2$-enriched gas either in short burst or at a controlled, steady flow rate. If so desired, the control system may deliver a minute, continuous flow of prepared gas through the network matrix during the day to maintain the in-matrix inventory in an enhanced state to off-set diffusion that will occur through the exhaust ports 26 in the secondary pipelines if a trickle of the enhanced gas were not continuously provided. In one preferred embodiment, a small amount of enhanced gas bleeds throughout the secondary pipelines during the daylight hours to keep the lines saturated with increased levels of $CO_2$ concentrations. This facility is capable of electronically controlling the remotely independent valves that control access the main manifolds of a field. An electronic control system in accordance with the invention will minimize capital and labor while maximizing crop yields.

FIG. 13 illustrates a separate aspect of the invention. In accordance with this aspect, tanker trucks can be filled with $CO_2$ gas when they are being emptied of their flowable contents, such as milk or cement. The pure $CO_2$ can displace an equal volume of liquid or flowable solid. As the liquid or flowable solid is removed from the tanker trucks volume, thus leave the tank with an entire dispatched volume of $CO_2$ that is not diluted by ambient air. This way, daily deliveries of pure $CO_2$ could be backhauled to the farmers for dilution and introduction to field crops that do not have ready access to trunk line deliveries of enhanced/prepared $CO_2$ gas. The $CO_2$ could be readily stored at a farms in a flexible bladder device that can be easily filled and emptied of pure $CO_2$ gas without dilution from ambient air concentrations.

Figure 8:
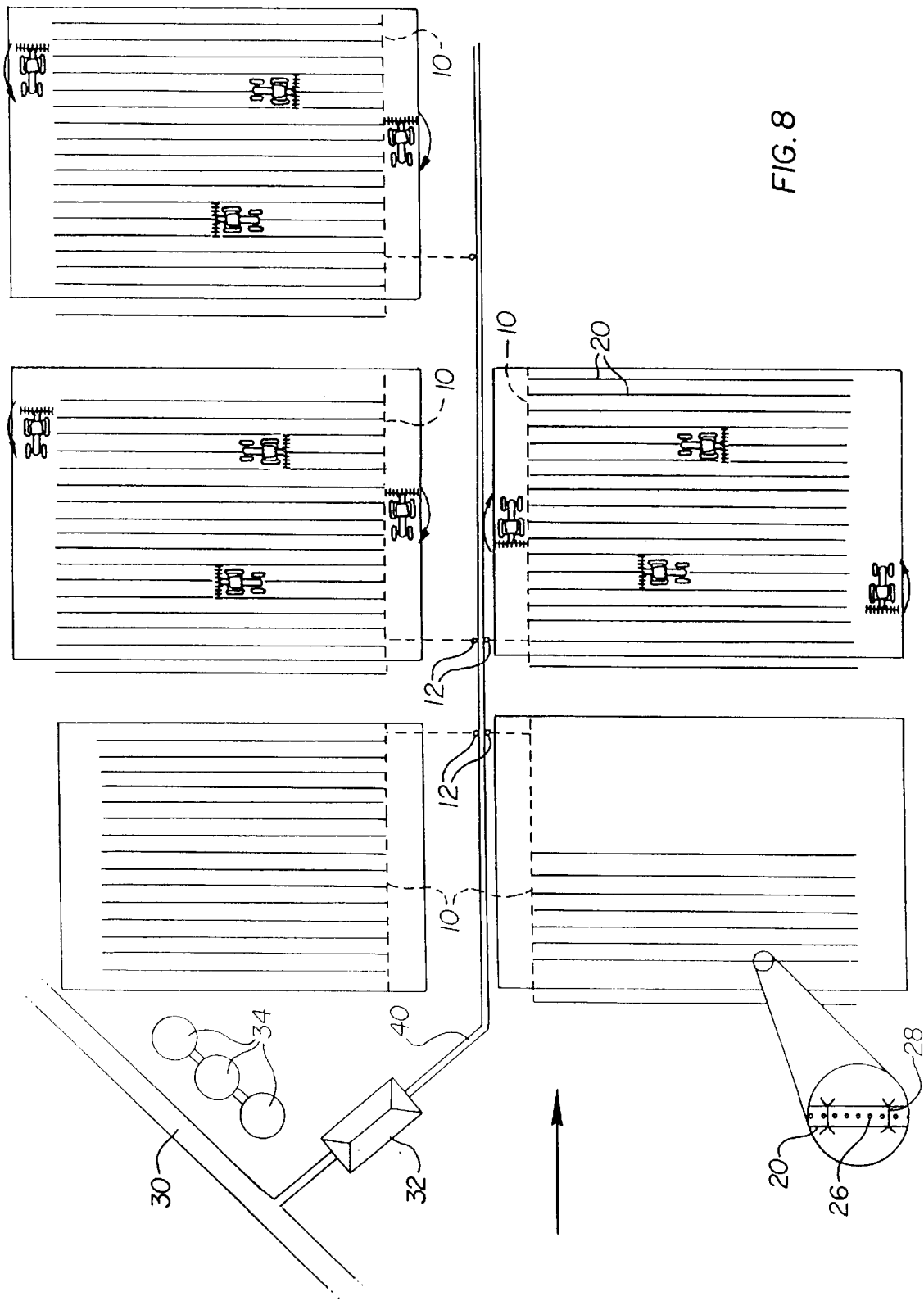
FIG. 8 schematically depicts secondary exhaust pipelines spaced about half the distance between the tractor tires.
Figure 9:
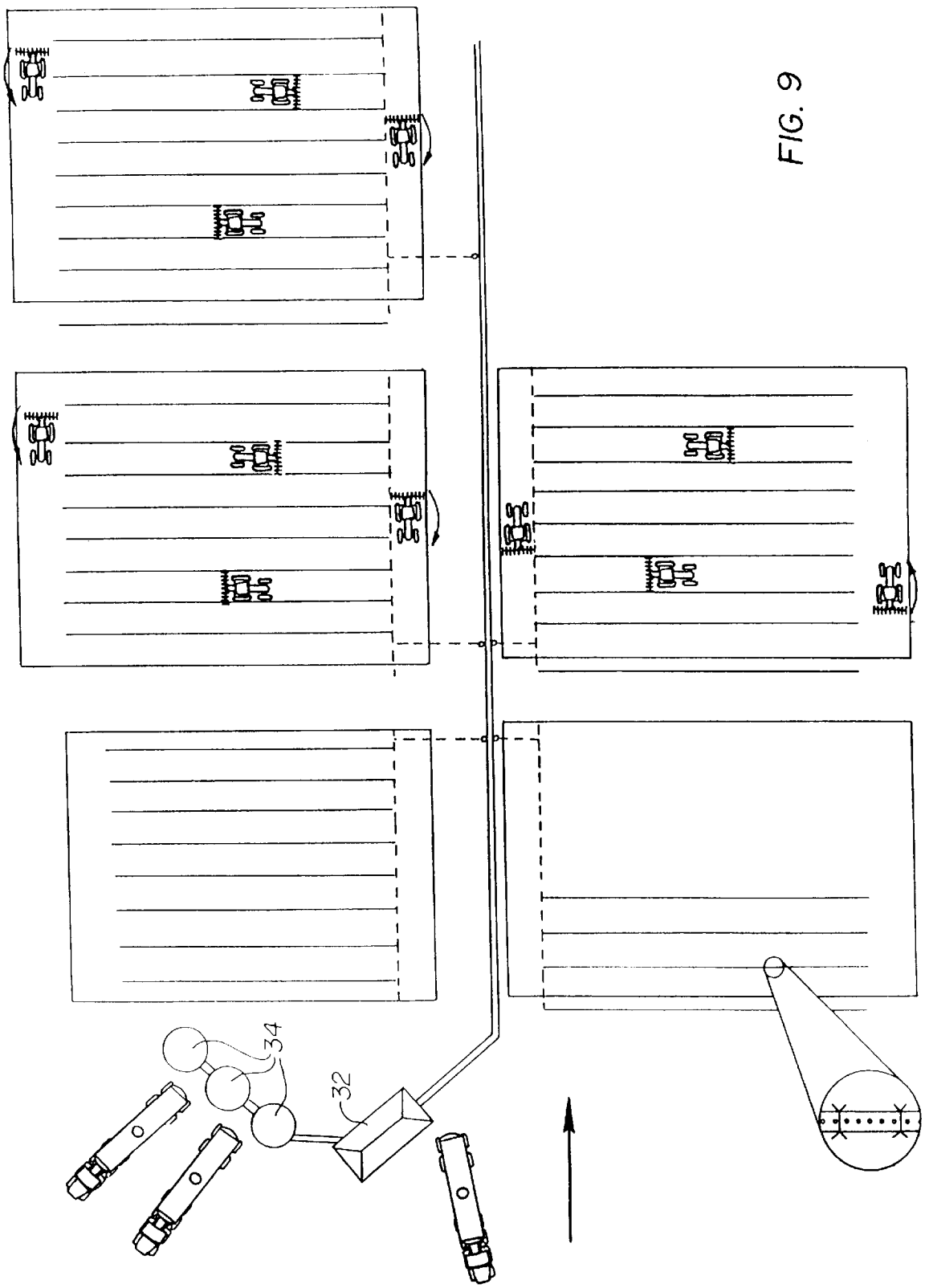
FIG. 9 schematically depicts tanker trucks backhauling deliveries of CO2 gas to agricultural sites for crop enhancement.

Conversely, the tanker trucks could deliver pure $CO_2$ to a gas preparation central facility and the gas preparation facility could then distribute the tanker truck delivered CO2 gas to numerous fields through a network of interconnecting trunk lines, primary manifolds, and secondary exhaust tubes. Such an arrangement is schematically illustrated in FIG. 9. It is worth noting that the primary difference between FIG. 8 and FIG. 9 is that in FIG. 8 the agricultural gas preparation plant 32 is supplied by a main gas pipeline 30 while in FIG. 9 the gas is supplied by the tankers.

If so desired, the agricultural gas preparation plant 32 can include storage tanks 34 for holding $CO_2$. Such tanks 34 can be used for night-time storage of $CO_2$ transmitted to the facility. Night time storage of $CO_2$ will permit the main pipelines 30 and/or trunklines 40 can operate consistently, and thus efficiently, over a 24-hour period delivering consistent volumes of $CO_2$ gas throughout a 24 hour period even though the rate at which the $CO_2$ is need varies widely during the course of a day.

Also, liquefied natural gas ships can be used to either backhaul $CO_2$ in the opposite direction of natural gas shipments and can be used to deliver $CO_2$ in regular delivery when LNG is in low demand. This can be deliver to remote production areas for a number of uses including refrigeration, oil well injection, plant growth enhancement, or to be stored as clathrates.

In certain aspects, the present invention could help promote the introduction of natural gas pipelines to farmers by making the distribution lines more economical to install. If government agencies promoted the concept, this could be like the Rural Electrification Act that promoted delivering electricity to farmers in the United States. This could result in significant national economic and energy efficiency gains.

Many countries like China, India, and other Far East Countries as well as Somalia, Ethiopia, Egypt, and other African countries, face severe food shortages. If the distribution went to farmers to create increased crop yields it would truly represent a strategic advantage for these arid countries. Also, these same countries are the ones that face the most acute fresh water shortages which could also be alleviated using $CO_2$ in agriculture to reduce water needs for irrigation. This would truly represent a win-win situation for these emerging economies/countries that face serious socio-economic development concerns. Crops may become cheaper to produce and would free large acreage to be donated to growing biomass energy crops for fuel which could now be produced for less cost than drilling for new oil reserves in environmentally sensitive areas like the Alaskan National Wildlife Refuge. If the advantages of some aspects of the present invention were realized, this would make $CO_2$, a by-product of natural gas combustion, a valuable commodity and natural gas could become cheaper than coal, resulting in cleaner air.

Further, the agricultural aspects of the present invention can be especially effective for small farms and encourages smaller equipment rather than largely intensive farming methods that promote soil erosion losses through water erosion and wind erosion. Increased planting densities and greater plant coverage in regions susceptible to severe wind erosion on a given year, like the "Dust Bowl" of the U.S. including Kansas and Oklahoma, will conserve soil and water resources. This is especially important in this region of the U.S. as the Oglalla Aquifer under the region is being pumped dry by irrigation. Consequently, many of the farmers of the region are being forced back to dry land farming practices versus the irrigation option of the past generation. Further, better water retention allows plants to use less water—especially good for arid climates where water is a precious resource. This will also provide the additional benefit of better use of fertilizer resulting in less pollution from fertilizer and pesticides. The present invention's enhanced gaseous medium will generally provide for greater plant root uptake of micro and macro nutrients, while reducing water uptake by partial closure of leave's stomata openings.

These same aspects of the invention will provide for more energy-efficient farming, because better yields will result without additional labor. These advantages are well suited to marginal lands where lack of atmospheric precipitation or access to irrigation water keeps the area just under levels of cropping economics. The system is also suited to areas where double cropping may be an option. The agricultural enhancements are also well suited to an area that through reduced water consumption can be raised to a crop species of greater market value. Enhanced $CO_2$ levels provided by this aspect of the invention are well suited for and can be used on steeper slopes where contour farming is employed. And it is especially important as sources of $CO_2$ such as food processing or fertilizer production facility centers concentrating crop production, thus resulting in lower transportation costs of the crops to market from these epicenters of food production.

Further, some embodiments of the invention provide a way to capitalize on an existing underutilized infrastructure that stands idle almost half of the year. Using an asset that has a high fixed costs and depreciation, and providing a productivity-enhancing system with low labor and maintenance costs can bring in additional profit. Properly controlled $CO_2$ and temperature applications in accordance with the invention can produce of up to 50% increase in yield per acre, savings on water consumption, and better return on current levels of fertilizer applications.

Consequently, $CO_2$ gas by-products that otherwise are relatively uneconomical to transport, can be beneficially reused rather than contributing to global warming. An advantage of most embodiments of the invention is they are not too costly to install, include few complicated moving parts, and uses pipeline infrastructure and existing piping installation techniques, pipes, valves, and pipe connectors. Most embodiments of the invention also require minimum labor and maintenance. For example, existing natural gas pipeline installation equipment can be used to install the $CO_2$ manifolds and secondary pipeline rows in agricultural applications.

What is claimed is:

1. A system for delivering carbon dioxide through a natural gas pipeline for use in enhancing growth of plants, the system comprising:
   a. a main gas pipeline adapted to transport both a carbon dioxide-containing gas and natural gas;
   b. a primary gas manifold positioned adjacent a field of plants;
   c. a trunkline for delivering the carbon dioxide-containing gas from the main gas pipeline to the primary gas manifold;
   d. and a plurality of secondary exhaust pipelines extending from the primary gas manifold into the field and including exhaust ports for delivering a carbon dioxide-rich gas to the plants.

2. The system of claim 1 wherein the secondary exhaust pipelines extend adjacent ground level across a length of the field, the exhaust pipelines being spaced from an end of the field opposite the primary gas manifold a distance at least as long as a maximum width of a farming implement to be used in the field.

3. The system of claim 1 wherein the primary gas manifold is positioned adjacent a first end of the field, the secondary exhaust pipelines extending adjacent ground level from a position spaced from the first end of the field by a distance at least as long as a maximum width of a farming implement to be used in the field.

4. The system of claim 3 wherein the primary manifold is positioned outside the perimeter of a field, the system further comprising a plurality of moveable connecting lengths, one connecting length extending from each of the secondary exhaust pipelines to the primary manifold, the connecting lengths being detachable at at least one of its ends to permit the connecting length to be moved aside to permit use of a farm implement in the field without interference.

5. The system of claim 1 wherein the secondary exhaust pipelines extend in generally parallel rows, each of the secondary exhaust pipelines being oriented generally perpendicular to a prevailing wind direction.

6. The system of claim 1 wherein the secondary exhaust pipelines are light weight and no more than about one inch in diameter.

7. The system of claim 1 wherein the secondary exhaust pipelines are attached to the ground by a plurality of stakes spaced along the length thereof.

8. The system of claim 1 further comprising a gas processing plant positioned adjacent the field for conditioning the gas prior to delivery to the primary gas manifolds.

9. The system of claim 1 wherein at least some of the secondary exhaust pipelines are positioned in a windbreak.

10. The system of claim 1 wherein the system further comprises a control system for controlling the composition of the carbon dioxide-rich gas in response to at least one predetermined control parameter.

11. The system of claim 10 further comprising an inlet for ambient air upstream of the secondary exhaust pipelines, the control system being adapted to admix a carbon dioxide enriched gas from the trunkline with a controlled volume of ambient air from the inlet to achieve a selected carbon dioxide concentration in the carbon dioxide-rich gas.

12. The system of claim 1 further comprising a source of heated gas and a control system, the control system being adapted to deliver heated gas to the field of plants to minimize frost damage to the plants.

13. The system of claim 12 wherein the control system includes a manually activated switch.

14. The system of claim 12 wherein the control system further includes at least one monitor in the field to monitor one or more predetermined control parameters.

15. The system of claim 12 wherein the system further comprises a temperature monitor to air temperature, a gas analyzer for monitoring carbon dioxide gas concentrations, and a photodetector for monitoring light levels in the field.

16. A method of utilizing waste carbon dioxide gas comprising
   a. during a cold season, transmitting refined natural gas containing less than 1% carbon dioxide through a pipeline from a natural gas collection site to a natural gas receiving site located remotely of the natural gas collection site;
   b. during a warm season, transmitting a carbon dioxide-enriched gas containing greater than 1% carbon dioxide through the same pipeline from a waste carbon dioxide collection area to a carbon dioxide utilization site, the carbon dioxide utilization site being located remotely of the natural gas collection site.

17. The method of claim 16 wherein the concentration of carbon dioxide in the carbon dioxide-enriched is maintained at a predetermined level of between about 3% and about 97%, the method further comprising relatively gradually increasing carbon dioxide concentration of gas in the pipeline from less than 1% to said predetermined level over an intermediate warming period between the cold season and the warm season.

18. The method of claim 16 wherein the carbon dioxide utilization site comprises a field of plants, the method further comprising distributing at least a carbon dioxide-rich fraction of the carbon dioxide-enriched gas in the field to enhance growth of the plants.

19. The method of claim 18 wherein the carbon dioxide-rich gas is delivered to the field during daylight, but ordinarily is not delivered to the field during the night.

20. The method of claim 18 wherein the carbon dioxide-rich gas is delivered to the field during a growing season for the plants in the field.

21. The method of claim 20 further comprising growing plants in the field until they reach a juvenile stage prior to initiating delivery of the carbon dioxide-rich gas.

22. The method of claim 18 wherein the carbon dioxide-enriched gas comprises methane and at least 3% carbon dioxide, the method further comprising separating the carbon dioxide-rich fraction from the carbon dioxide-enriched gas prior to distributing gas in the field, the carbon dioxide-rich fraction being substantially free of methane.

23. The method of claim 22 wherein the carbon dioxide-rich fraction is separated at a gas processing facility located adjacent the pipeline at a location near the carbon dioxide utilization site.

24. The method of claim 16 wherein the carbon dioxide-enriched gas includes methane, the method further comprising refining a raw natural gas to yield a refined gas containing greater than 90% methane and less than 1% carbon dioxide, then introducing carbon dioxide to the refined gas to yield the carbon dioxide-enriched gas.

25. The method of claim 24 further comprising separating a carbon dioxide-rich fraction from the carbon dioxide-enriched gas at a site remote from the carbon dioxide collection area prior to using the gas.

26. The method of claim 16 wherein the carbon dioxide-enriched gas comprises at least 3% carbon dioxide.

27. The method of claim 26 wherein the carbon dioxide-enriched gas comprises no more than about 97% carbon dioxide and further comprises a refined natural gas containing methane.

28. The method of claim 27 further comprising separating a carbon dioxide-rich fraction from the carbon dioxide-enriched gas at a site remote from the prior to using the gas.

29. The method of claim 16 wherein the natural gas collection point comprises an off-shore platform and the carbon dioxide collection area is based on land, at least a length of the pipeline extending between the off-shore platform and land.

30. The method of claim 29 wherein the natural gas receiving site is land-based and the carbon dioxide utilization site is off-shore, such that natural gas is delivered from off-shore to land during the cold season and carbon dioxide is delivered from land to off-shore during the warm season.

31. The method of claim 30 wherein the natural gas is collected from an underground reserve, the in-line inventory of natural gas which exists when the direction of gas flow is reversed at the onset of the warm season being redeposited in the underground reserve.

32. The method of claim 30 further comprising sequestering the carbon dioxide-enriched gas delivered to the carbon dioxide utilization site in a body of water as clathrates.

33. The method of claim 30 further comprising utilizing the carbon dioxide-enriched gas delivered to the carbon dioxide utilization site to enhance the growth of aquaculture.

34. The method of claim 30 further comprising injecting the carbon dioxide-enriched gas delivered to the carbon dioxide utilization site underground to enhance oil recovery.

* * * * *